Aug. 14, 1962 G. BECKER ETAL 3,049,288
CHANGE COMPUTING APPARATUS IN BUSINESS MACHINES
Filed Jan. 23, 1957 11 Sheets-Sheet 1

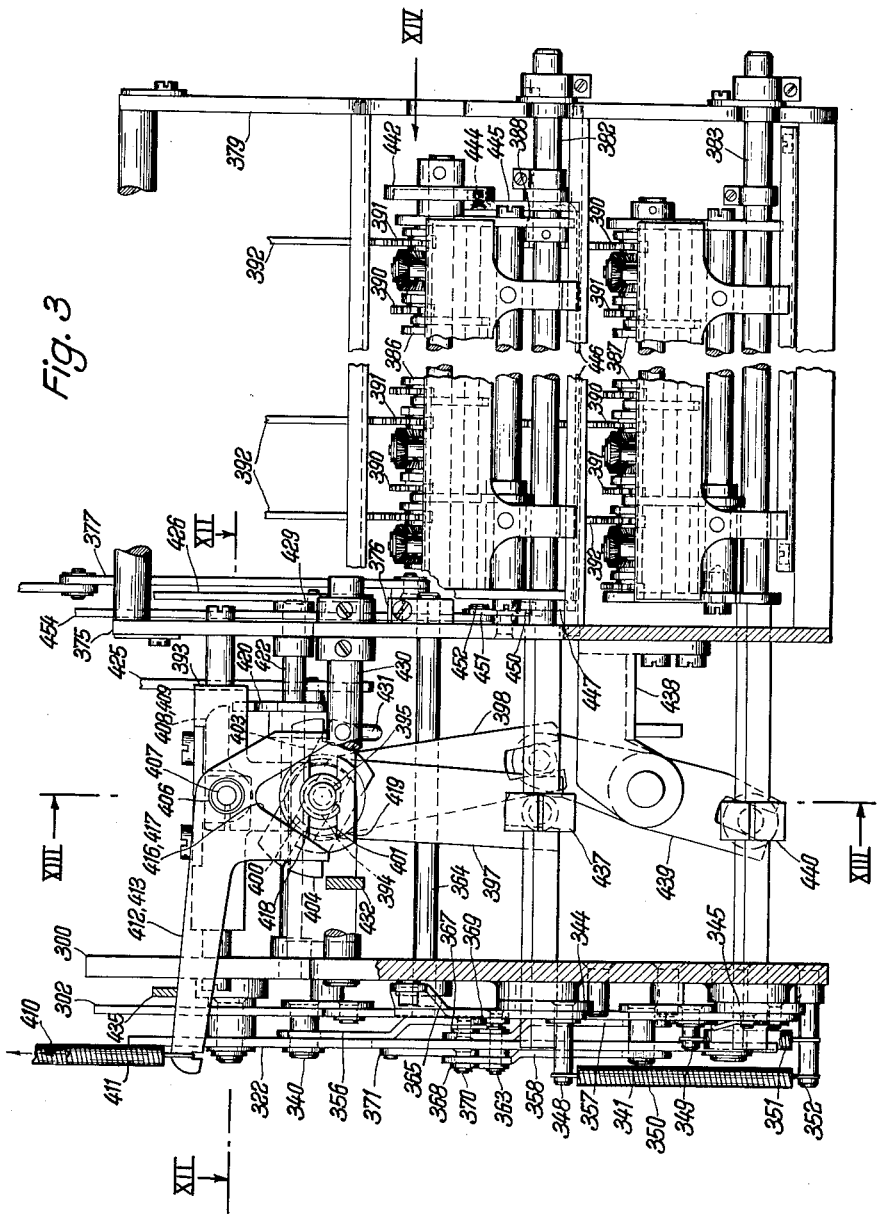

Aug. 14, 1962   G. BECKER ETAL   3,049,288
CHANGE COMPUTING APPARATUS IN BUSINESS MACHINES
Filed Jan. 23, 1957   11 Sheets-Sheet 4

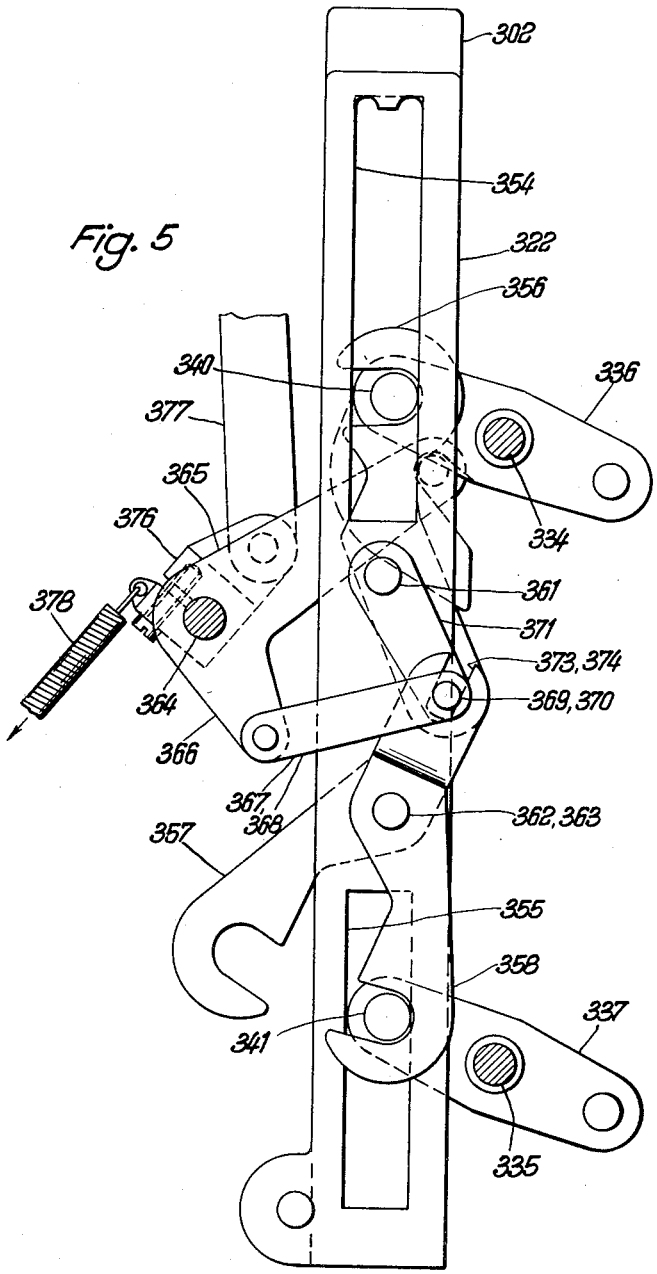

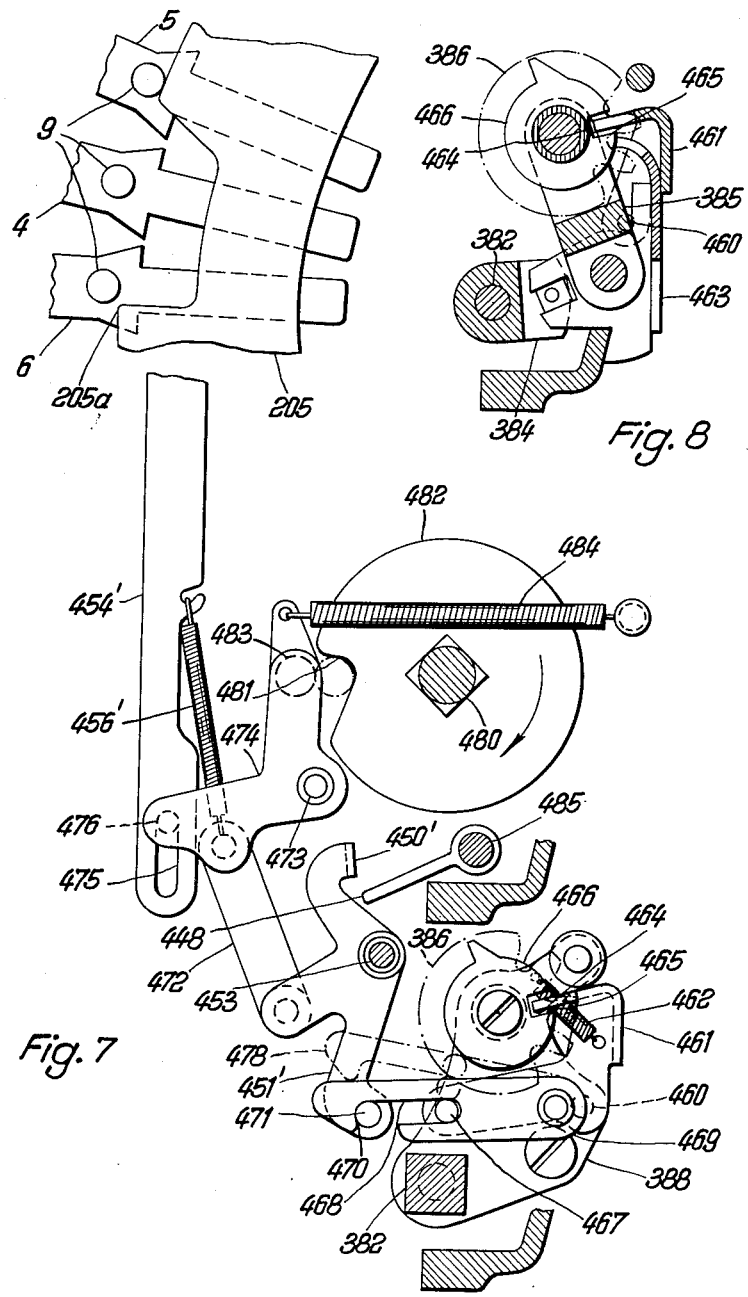

Aug. 14, 1962     G. BECKER ETAL     3,049,288
CHANGE COMPUTING APPARATUS IN BUSINESS MACHINES
Filed Jan. 23, 1957     11 Sheets-Sheet 10
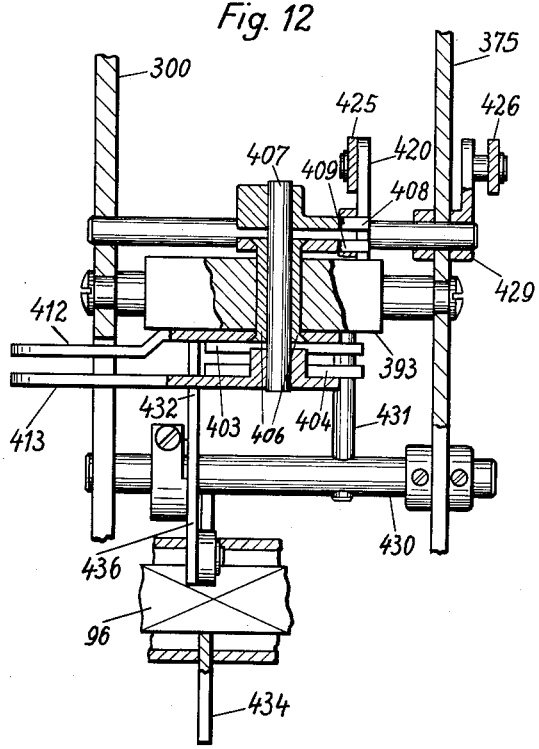
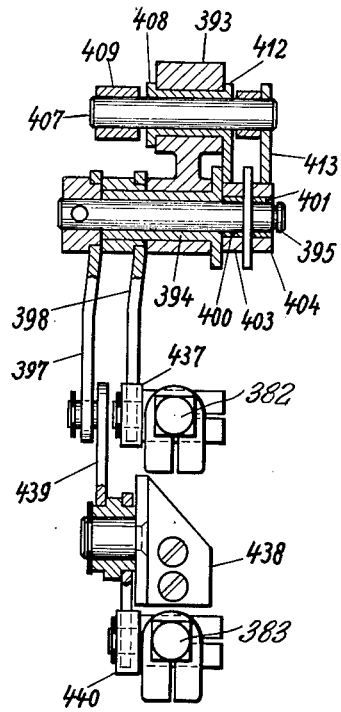
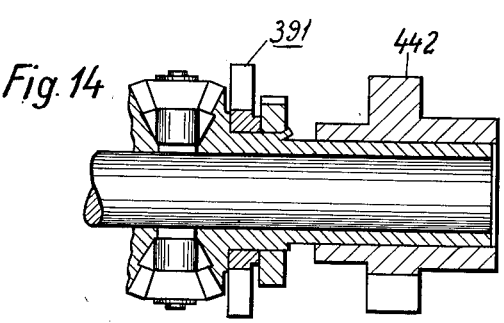

Aug. 14, 1962 G. BECKER ETAL 3,049,288
CHANGE COMPUTING APPARATUS IN BUSINESS MACHINES
Filed Jan. 23, 1957 11 Sheets-Sheet 11
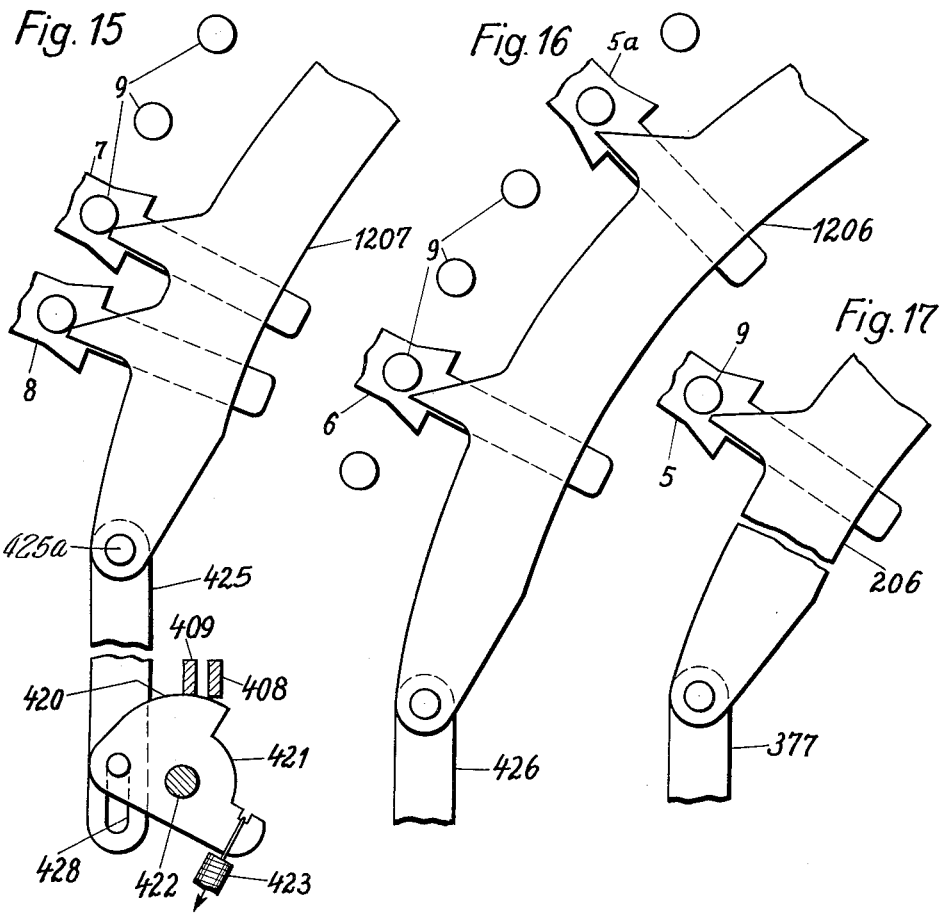
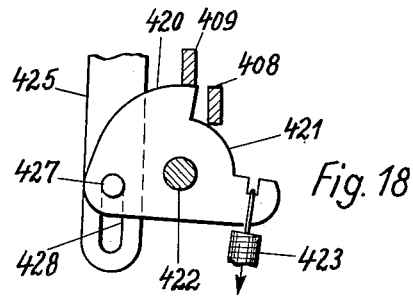

United States Patent Office 3,049,288
Patented Aug. 14, 1962

3,049,288
CHANGE COMPUTING APPARATUS IN
BUSINESS MACHINES
Gerhard Becker and Ernst Borgmann, Bielefeld, Germany, assignors to Anker-Werke A.G., Bielefeld, Germany, a corporation of Germany
Filed Jan. 23, 1957, Ser. No. 635,713
Claims priority, application Germany Jan. 28, 1956
18 Claims. (Cl. 235—2)

Our invention relates to change computing apparatus in business machines such as cash registers, calculating or accounting machines and the like, which, aside from registering and totalizing current business transactions, are capable of indicating and printing the amount of "change" as determined by the difference between receivable and received amounts.

Such an automatic indication of the amount of change to be paid out by the cashier greatly simplifies his activities because all additons and subtractions involved in a business transaction are performed by the machine. The machine operator is relieved of all calculating work so that a rapid and fluent servicing of the customer is attained and the necessity for customers to wait in line at the cashier's station, often occurring in self-service stores, is minimized or eliminated.

It is often necessary for the cashier to consider, aside from taxable merchandise, the necessity for refunds such as for empty bottles, and discounts such as for credit stamps and coupons. Besides, the customer may pay by means of a bank check instead of cash.

It is an object of our invention to simplify the servicing of customers by the clerk, not only by eliminating the necessity for calculating the amount of change or the residual amount receivable in such cases, but by also relieving the clerk from calculating whether the amount of cash or of a check received from the customer exceeds the receivable grand total indicated by the machine, so that the clerk can limit his attention substantially only to posting the proper amounts; and it is a more specific object to make the use of the machine error-proof in the sense of preventing untimely or improperly sequenced actuation of the machine-run controlling keys, thus eliminating the need for repetition in the event an inadvertent attempt is made, in the course of composite business transactions, to depress a wrong control key.

Machines of the type here concerned are provided with a key that releases the machine operation for drawing the grand total or balance as the difference between a receivable amount and the actual amount received. Now, occording to the invention, and for achieving the above-mentioned object, we provide the machine with a key blocking apparatus which blocks the just-mentioned control key as soon as a transaction item is posted into the keyboard and which thereafter keeps the control key blocked until the total amount calculated by the machine is at least equal to a "received" amount entered into the keyboard of the machine as a minimum value.

When the registering of several dependent transaction items is involved and the first-posted amount is registered, the key for releasing a sub-totalizing operation is released for actuation, while the machine-run releasing key for indication of the change to be paid out is blocked. Only after a sub-total composed of one or several positive or negative items is drawn and after the amount paid by the customer in form of currency or check is posted into the machine, will the "change" key be released for actuation if the amount last registered is at least equal to the amount determined by the amount of the sub-total. If the last registered amount does not reach the amount determined by drawing the sub-total, then the "change" key remains blocked, and the machine operation can be released only by entering another item or by means of a sub-total key.

When releasing the machine operation by means of the "change" key, the difference between the receivable amount and the amount paid by the customer is indicated and is printed upon the various register and check tapes.

Many customers attempt to accelerate payment at the cash register by offering to the cashier the correct amount of the total indicated by the cash register. For such cases, and in accordance with another feature of our invention, the keys for releasing the machine operation or actuating the balance totalizers are mutually interlocked in such a manner that after the drawing of a total balance, a machine operation embracing all posted items can be terminated or continued not only by means of the grand-total key that terminates a preceding operation composed of a group of correlated machine runs, but also by means of the key which initiates the calculation of the change resulting from the business transaction.

The foregoing and more specific objects, advantages and features of the invention will be understood from the embodiments illustrated by way of example on the accompanying drawings.

FIG. 3 is a partly sectional rear view of the assembly for computing the amount of change, including a number of displaceable control members.

FIG. 5 is a side view of the switching means for the selection of computing mechanisms, these means being shown in "addition" position.

FIG. 7 is a part-sectional side view of a second embodiment.

FIG. 8 shows a detail of FIG. 7.

Figure 11:
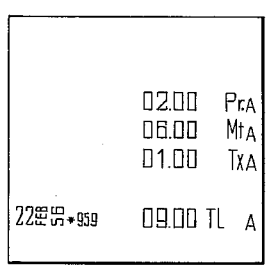

FIG. 11 exemplifies a check slip as issued by the machine when the balance computing device is not used.

FIG. 12 is a horizontal cross section along the line XII—XII in FIG. 3.

FIG. 13 is a vertical sectional view along the line XIII—XIII in FIG. 3.

FIG. 14 shows a sectional view of a detail at the location marked by an arrow XIV in FIG. 3.

Figure 2:
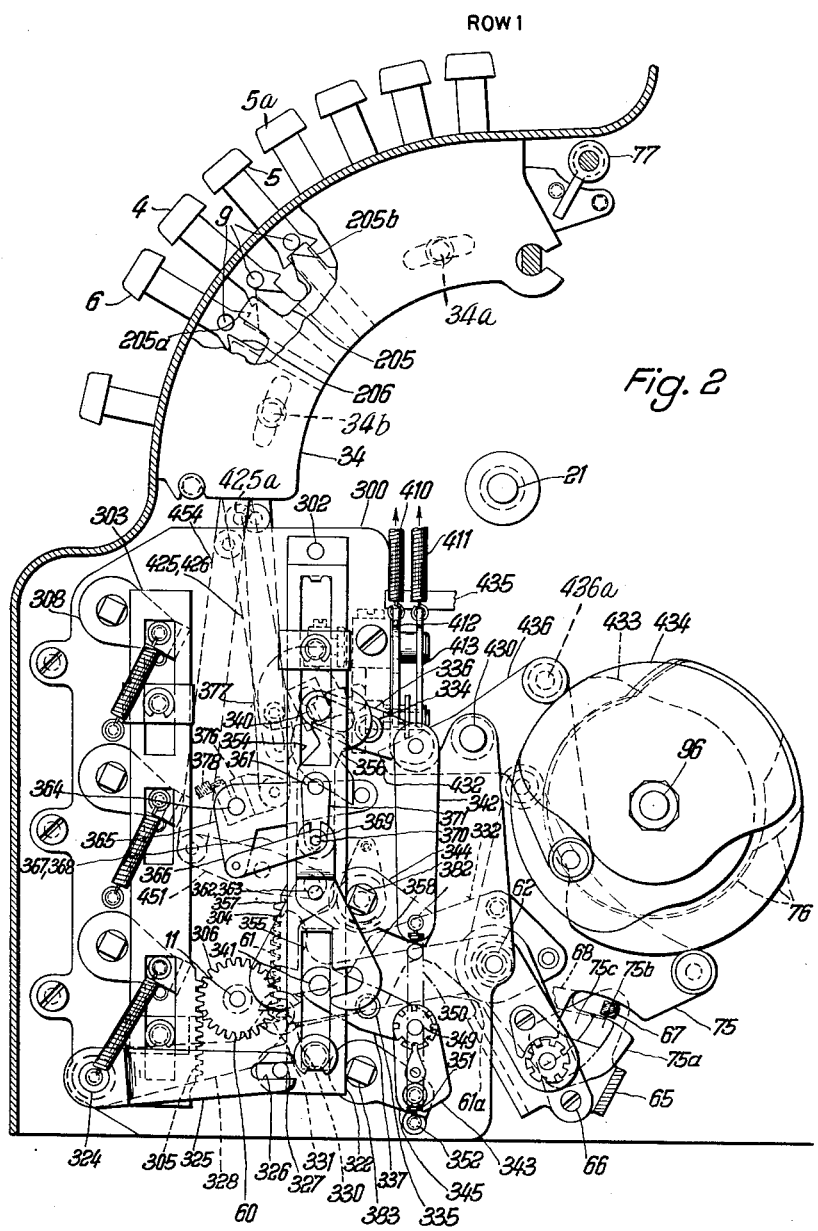
FIG. 2 illustrates, partly in section, a side view of the machine comprising a number of mechanisms for the selection of computer mechanisms.
Figure 4:
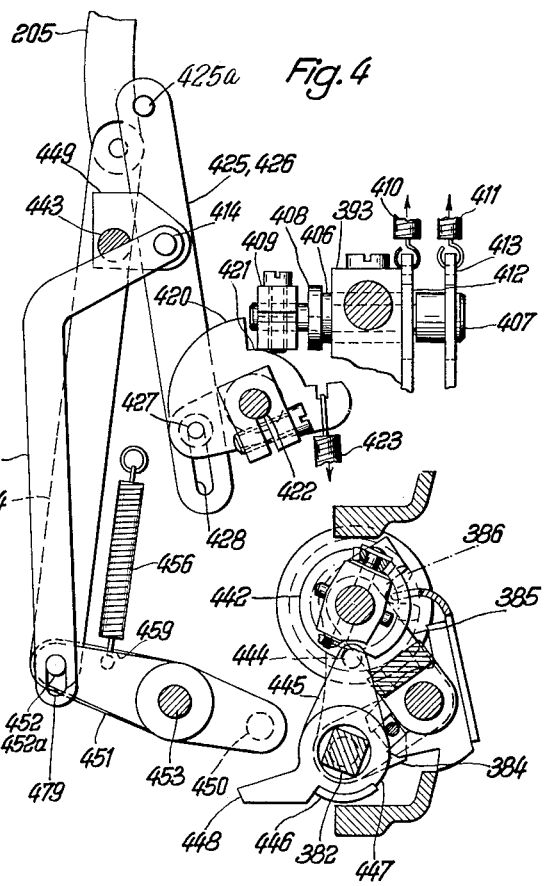
FIG. 4 is a partly sectional side view of the switching devices that secure blocking of the keys.

FIGS. 15, 16 and 17 show details seen from the same viewpoint as FIGS. 2 and 4.

FIG. 18 shows a plus-minus selector cam in an operating position different from those shown in FIGS. 4 and 15.

The keyboard (FIG. 1) of the illustrated machine is provided with five vertical rows of amount keys 37 and three rows of control keys of which the row 1 serves for controlling the type of machine operation, and rows 2 and 3 comprise keys for the selection of respectively different computing mechanisms. In row 1 are a sub-total key 5, a total key 5a, a change key 6, and in row 2 a refund key 7 and a check-registering key 8 controlling, in a manner described below, the balance totalizing mechanism of the machine, which mechanism is occupied, always in the positive sense, by the other control keys of row 2.

In accordance with the design of generally known cash registers, the keys of each row are depressively mounted in a stationary frame structure or bank unit 34 (FIG. 2), and each key has a cross pin 9 in front of sliders 205, 206, 1206, 1207 (FIGS. 2, 10, 15, 16, 17) of arcuate shape which are displaceably guided in structure 34 by pin-and-slot guides 34a and 34b (FIG. 2).

Slider 205 has projections 205a, 205b which, when located beneath a cross pin 9, lock the appertaining key so that it cannot be depressed by the operator. Slider 206 has projections with slanting flanks so that depression of any one key of the row causes a corresponding displacement of slider 206 by means of which the amount or signal denoted by the key is registered and the other keys of the same row are blocked. Switching mechanisms (not illustrated) rotatably mounted on a shaft 21 and driven from the machine main shaft 96 operate to scan the posted data off the key transfer sliders 207 and to transfer the data to the corresponding control devices for adding and calculating mechanisms (not illustrated), while a key blocking device, cooperating with a machine clearing shaft 77, supervises the proper cooperation of the various registering mechanisms.

The machine main shaft 96 (FIG. 2) is provided with a number of cam discs 76 whose respective cam contours are shaped in accordance with the various types of machine operation: "addition," "sub-totalizing," and "totalizing." The cams 76 drive respective followers 75 rotatably mounted on a shaft 62 and provided with respective rollers in engagement with the contours of the respective cams. The followers 75 have respectively different extensions 75a, 75b, 75c for cooperation with a square shaft 67. Shaft 67 is attached to a bracket 65 pivoted on a shaft 66 which is mounted on an angular lever 61a. Lever 61a is rotatably journalled on shaft 62 and has a row of rack teeth 61. By means of a pull rod 68 (partially shown in FIG. 2) the one depressed operation-control key selects the one particular follower 75 that corresponds to the desired type of machine operation. This selected follower 75 then drives, by means of its extension 75a, 75b or 75c, the square shaft 67 and thereby the bracket 65 and the angular lever 61a. The rack portion 61 of lever 61a meshes with a spur gear 60 on a shaft 11 so that the just-mentioned motion is imparted by lever 61a to the shaft 11.

Certain of these devices which make up the complete business machine of the present invention are well known to those skilled in the art, and are therefore not fully described herein, since they form no part of the invention proper. However, for those who wish to become familiar with related devices in order to better understand the invention, reference is made to U.S. Patent 1,242,170 to F. L. Fuller for a description of the operation of a related type of main adding mechanism designed to function as an adding-subtracting device and equipped with several subsidiary adding mechanisms so that positive as well as negative amounts can be entered and computed therein. Also described in that reference are amount keys and adding mechanism keys as well as a lever for controlling the operation "addition," "sub-total," and "total." Attention is especially directed for these purposes to the portions of that reference entitled "Operating Mechanism," "Keyboard," "Amount Differential Mechanism," and "Totalizers," for descriptions and illustrations of known and related types of key banks, key-blocking means, differential or switching mechanisms, as well as control means for related individual operations.

Two slide bars 302, 303 (FIGS. 2, 3, 5) are guided for longitudinal displacement on a side wall 300 (FIG. 2) by means of pin-and-slot connections. A spur gear 306 is pinned to the above-mentioned shaft 11 in coaxial relation to the above-mentioned spur gear 60. Spur gear 306 meshes with rack teeth 304, 305 (FIG. 2) of respective slide bars 302 and 303 so that the above-described revolving motion of shaft 11 has the effect of displacing the two bars 302 and 303 in mutually opposed directions parallel to each other. The slide bar 303 serves for the coupling of adding mechanisms (not illustrated) which can be turned by means of segments 308 (FIG. 2, left middle) from inactive to active position.

Another slide bar 322 (FIGS. 2, 3, 5) is displaceably mounted parallel to the slide bar 302. A switching shaft 324 (FIGS. 2, lower left) carries an arm 325 which has a forked recess 326 straddling a pin 327 secured to slide bar 322. Another arm 328 on switching shaft 324 carries a pin which engages a recess of a control lever 332. Lever 332 is pivotally mounted on shaft 62 and is pinned together with the follower 75 (extension 75c) assigned to the operation "addition." When this particular follower 75 is selected by depression of the correlated control key and is being driven from the machine main shaft 96 by means of the appertaining cam disc 76, then the driving motion is transmitted by control lever 332 to slide bar 322 through the arms 328, 325 of switching shaft 324.

Two pivot pins 334 and 335 (FIGS. 2, 5) are riveted to the side wall 300 and carry respective switching levers 336 and 337. Each switching lever 336, 337 possesses a dog pin 340 or 341 at one lever end. The other end of each lever is pivotally joined with a bearing segment 344, 345 by means of a connecting link 342, 343 (FIG. 2). Respective springs 350, 351 have one end hooked to the pivot pins 348, 349 (FIG. 3) which join the links with the respective bearing segments 344, 345. The other ends of springs 350, 351 are secured to the side wall 300 by means of stationary pins 352. The springs 350, 351 normally maintain the two bearing segments 344 and 345 in the position illustrated in FIG. 2.

The dog pins 340, 341 extend through openings 354, 355 of the respective slide bars 302, 322 into the swinging range of coupling levers 356, 357, 358. The coupling levers 356 and 357 are pivotally mounted by means of respective pivot pins 361 and 362 on slide bar 302. The coupling lever 358 is rotatable on a pivot pin 363 of slide bar 322. An angular lever 365 (FIGS. 2, 3, 5), rotatably mounted on side wall 300 by means of a switching shaft 364, is operatively connected with the coupling levers 356, 357, 358 by two links 367 and 368 which are both pivotally connected by the arm 366 of lever 365. Link 367 is connected by a pivot pin 369 with coupling lever 356. Link 368 is connected by a pivot pin 370 with a lever 371 which is rotatably mounted on slide bar 322. The coupling levers 357 and 358 have respective recesses 373 and 374 which straddle the respective pivot pins 369, 370 and thus are joined therewith for constrained motion.

The above-mentioned switching shaft 364, whose other end is journalled in an intermediate wall 375 of the machine frame structure (FIG. 3), is firmly connected with another angular lever 376 (FIGS. 2, 5). One of the transfer sliders 206 (FIGS. 2, 17) of the operation control bank 1 of the keyboard is linked with the lever 376 by means of a pull rod 377. A spring 378 (FIG. 5) is attached to the angular lever 376 and biases the switching shaft 364 counterclockwise. As a result, the angular lever 366 and the links 367, 368 tend to turn the coupling lever 358 on slide bar 322 clockwise about its pivot 363; while the coupling lever 356 on slide bar 302 is biased counterclockwise about its pivot 361; and the coupling lever 357, likewise pivoted to bar 302, is biased clockwise about its pivot 362. Consequently, the biasing spring 378 (FIG. 5) has the effect of normally holding the coupling levers in the active position illustrated in FIG. 5. In contrast thereto, the same coupling levers are illustrated in FIG. 2 in their respective inactive positions which, however, can only be obtained under control of a depressed operation-control key of the keyboard, for instance of the "total" key 4 of bank 1. Hereinafter, the term "normal" position of the machine is understood to refer to the active switching position of the coupling levers 356 to 358 which is prepared by action of the spring 378 and corresponds to the operation "addition," this "normal" position being the one illustrated in FIG. 5.

The bearing segments 344, 345 serve for guiding two control shafts 382, 383 which are displaceably and revolvably mounted in intermediate walls 375 and 379 of the machine frame structure (FIG. 3). The control shafts 382, 383 have a squared cross section at the respective ends cooperating with the bearing segments 344 and 345 (FIGS. 3, 4). Mounted on control shafts 382 and 383 are respective adding-subtracting (add-sub) mechanisms 386 and 387 (FIG. 3) or balance-totalizers which are interconnected by a knee-type linkage formed by two arms 384 and 385 (FIG. 4). The add-sub mechanisms are generally known and their particular design is not essential to the invention proper and for that reason not further illustrated and described. In accordance with conventional computing mechanisms of this type, each digit position in each of the add-submechanisms 386, 387 has a spur gear (positive counting gear) 390 assigned to positive values, and has also a spur gear (negative counting gear) 391 which is assigned to negative values and is differentially connected with the positive gear 390 by means of an intermediate differential gear so that the entering of numerical values into the computing mechanisms by means of spur-gear segments 392 (FIG. 3), for the purpose of performing additions and subtractions, can occur only in the positive sense of rotation. For subtracting operation, the particular add-sub mechanism 386 or 387 must be axially displaced so that the negative counting gears 391, instead of the positive gears 390, enters into meshing engagement with the appertaining gear segment 392.

The device for thus displacing the computing or balance totalizer mechanisms 386, 387 is designed as follows:

A stationary bearing block 393 (FIGS. 3, 12, 13) is fastened by means of screw bolts between the side wall 300 and the intermediate wall 375 of the frame structure. Block 393 has two journal bores. One of these bores carries a pivot shaft 395 surrounded by a sleeve 394. The ends of sleeve 394 and shaft 395, facing away from the observer as viewed in FIG. 3, are riveted together with respective levers 397 and 398; and the other end facing toward the observer, as viewed in FIG. 3, are provided with respective bearing members 400 and 401 which form the bearings for respective control bridges 403 and 404. The second journal bore of bearing block 393 accommodates a rotatable pivot shaft 407 surrounded by a sleeve 406. The rear ends of sleeve 406 and pivot shaft 407 are firmly connected with respective feeler levers 408, 409. The forward ends of sleeve 406 and shaft 407 are riveted together with respective control levers 412 and 413 (FIGS. 3, 4, 13) each biased clockwise (relative to FIG. 3) by a spring 410 or 411 (FIG. 4). The control levers 412, 413 have respective bifurcated portions which straddle and engage respective projections 418, 419 of bridges 403 and 404. The feeler levers 408, 409 cooperate with a stepped cam disc 420 (FIGS. 4, 15, 18) for plus-minus selection. The plus-minus selector cam 420 (FIGS. 2 3, 4) is rotatably journalled between walls 300 and 375 by means of a shaft 422 and is biased clockwise (FIG. 4) by a spring 423. Normally, however, the plus-minus selector cam 420 is prevented from being moved by spring 423 because a stop pin 427 of cam 420 abuts against the end of a slot 428 in a pull rod 425 which is linked at 425a (FIGS. 2, 4) to the key slider 1207 (FIG. 15) of the operation-control bank 1.

Connected with the control shaft 422 by means of a lever 429 is another pull rod 426 (FIGS. 2, 4) which is linked to a key-actuated transfer slider 1206 (FIG. 16) of the adding-mechanism selector key bank 2, so that the plus-minus selector cam 420 can be controlled by actuating the keys 5a and 6 of the operation-control key bank 1 as well as the keys 7 and 8 of the adding-mechanism key bank 2. FIG. 4 shows the selector cam 420 in the negative position, as contrasted with the positive selector position effected by action of the spring 423 in accordance with the operation "addition" prepared by action of the spring 378. This "positive" position, shown in FIG. 15, is hereinafter referred to as the "normal" position of the plus-minus selector cam 420. Cam 420 may also occupy a third position, shown in FIG. 18, for totalizing operation.

A latch lever 435 (FIGS. 2, 3), controlled by the machine drive through a cam (not illustrated), releases the switching levers 412, 413 at the beginning of the machine run so that the springs 410, 411 can turn the levers 412, 413 clockwise about their respective pivot points 406, 407. As a result, the bridge structure 403 gliding on the bearing member 400 and controlled by the feeler lever 408, and the bridge structure 404 controlled by the feeler lever 409 are displaced toward the left or right relative to FIG. 3 until the feeler levers 408, 409 abut against the contour portion 421 of the plus-minus selector can 420 (FIGS. 3, 4) displaced by the above-described actuation of keys in bank 1 or 2.

The bridge structure 403 cooperates with a lateral dog pin 431 of a control shaft 430 (FIG. 3). The bridge 404, located behind bridge 403 (FIG. 3), cooperates with an extension 432 (FIGS. 2, 3) of a follower lever 436 which is pinned onto the control shaft 430 and carries a cam roller 436a (FIG. 2). The control shaft 430 is revolvably mounted in and between the walls 300 and 375 of the frame structure. The roller 436a of follower 436 is in engagement with a pair of cams 433, 434 rigidly mounted on the machine main shaft 96.

The switching lever 397 (FIG. 3) riveted together with sleeve 394 journalled on pin 395, is connected with the control shaft 382 by means of a bearing block 437 secured to the square portion of the control shaft 382. The switching lever 398 riveted together with pin 395 is joined, by constrained sliding engagement, with an intermediate lever 439 rotatably mounted on a bearing block 438 which is secured by screws to the intermediate wall 375. The intermediate lever 439 has a bifurcated portion straddling a pin of a bearing block 440 which is fastened on a square portion of control shaft 383 to transmit axial sliding motion thereto.

If, for instance, the follower 436 on control shaft 430 is turned clockwise by means of a cam pair 433, 434 on the machine main shaft 96, then the dog pin 431 (FIGS. 2, 3) riveted into control shaft 430 engages the bridge structure 403, which FIG. 3 shows in rotated position, and moves the bridge structure counterclockwise about its pivot 394. Simultaneously, the bearing block 400 and the above-mentioned sleeve is effective to also turn the switching lever 397 counterclockwise so that the control shaft 382 and thus the add-sub mechanism 386 are shifted toward the right (FIG. 3) into positive position.

The above-mentioned add-sum mechanisms 386 and 387, hereinafter called "minus mechanism" and "plus mechanism" respectively, form together the balance computing device of the machine and also serve for computing the amount of "change," i.e. the difference between receivable and received amounts, to be indicated and printed.

If the positive sides (counting gears) 390 of the two mechanisms are taken in view (FIG. 3), then, in the zero condition:

The minus mechanism 386 is in the position ____ 999999
And the plus mechanism 387 is in the position __ 000000

That is, the minus mechanism 386 has already advanced one numerical unit, namely by the so-called "escaping one" or "fugitive digit." This obviates the otherwise necessary switching means for switching the escaping one. For addition, both mechanisms are loaded on the positive side (gears 390), and for subtraction both mechanisms are loaded on the negative side (gears 391). Consequently, true positive sums are always located on the positive side of the plus mechanism 387, whereas true negative amounts are always located on the negative side of the minus mechanism 386.

The following device is provided for selecting and controlling the proper computing mechanism 386, 387 for drawing a balance:

The unit of the highest digital value position in the minus mechanism 386 is rigidly joined with a cam 442 (FIGS. 3, 4, 14) which cooperates with a pin 444 of an arm 445 rotatably mounted on the control shaft 382. A bridge 446 connects the arm 445 with a switching member 447 which is rotatably mounted on the control shaft 382 and has a projecting arm 448.

Figure 10:
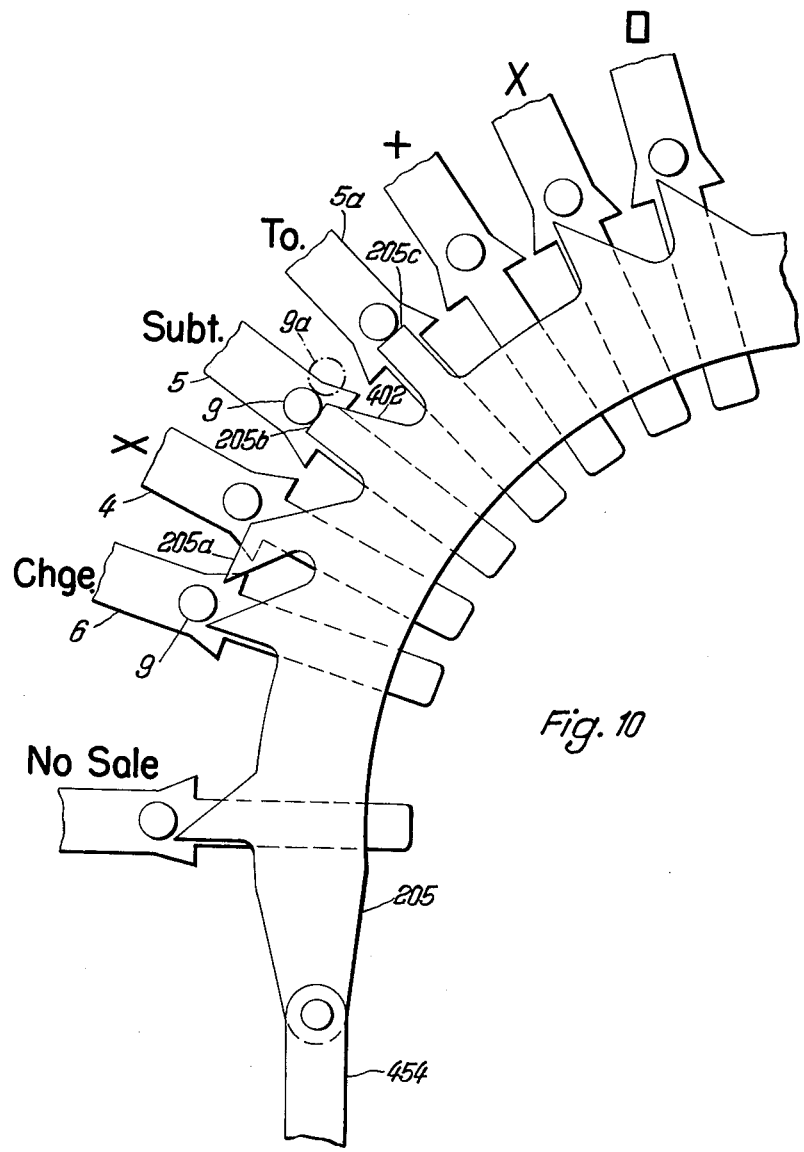
FIG. 10 is a side view of one of the key sliders of the operation-controlling key bank.

A double-armed lever 451 (FIGS. 3, 4) rotatably mounted wall 375 carries a stop pin 450 in the swinging range of projection 448 of a switching member 447. A pull rod 454 is linked to lever 451 by a pivot pin 452 and connects lever 451 with the key locking slider 205 of the operation control key bank 1 (FIGS. 2, 10). A spring 456 hooked into lever 451 normally maintains this lever in the position illustrated in FIG. 4.

When during posting of an amount into the keyboard the highest digit position of the minus mechanism passes beyond the value "9," then the counting unit assigned to this digit position in mechanism 386 causes the cam 442 to turn the switching lever 445 clockwise on control shaft 382 (FIG. 4). Simultaneously, the key locking slider 205 (FIG. 2) is displaced, in a manner still to be described, by bridge member 446 (FIG. 4), switching lever 447, arm 451, and pull rod 454.

The operation of the described apparatus is as follows:

Assume, for example, that a sale made by salesman "B" in the meat department, amounting to $0.99, is to be registered. Then the cashier depresses the salesman-identifying key B in row 3 of the keyboard (FIG. 1) and posts the amount of $0.99 into the amount-key field 37, whereafter he releases the machine run by depressing the "Meat" key in row 2. The ensuing machine run causes the posted data, now represented by the setting of the corresponding key-actuated transfer sliders (206 in FIG. 2) to be sensed with the effect of transferring the posted amounts into the selected adding mechanisms. At the beginning of the same machine run, the switching levers 412, 413 are released by latch lever 435 and are caused by their representative springs 410, 411 (FIGS. 2, 3, 4) to turn the feeler lever 408, 409 into feeling engagement with the plus-minus selector cam 420 then in its positive position. That is, the feeler levers 408, 409 move clockwise (FIG. 3) about their pivot 407 until they are stopped by the plus-minus selector cam 420 (FIGS. 4, 15). As a result, the bridge structure 403, displaceably mounted on bearing member 400, is shifted toward the right (FIG. 3) due to the action of the fork opening 416 of switching lever 412, so that bridge 403 enters into the active range of the dog pin 431 on control shaft 430.

During the continuing clockwise rotation of the machine main shaft 96 (FIG. 2) the follower 432 and thus the control shaft 430 are turned clockwise as already described, so that the bridge 403, by means of the likewise rotating pin 431 is turned clockwise about pivot 395 together with the switching lever 397 joined with the bridge 403. During this motion the bearing member 437 displaces the control shaft 382 with the minus mechanism 386 toward the right relative to FIG. 3. As a result, the positive counting gear 390 of the minus mechanism 386 enters into the meshing range of gear segment 392; while the plus mechanism mounted on control shaft 383 remains in the positive position of engagement shown in FIG. 3, in accordance with the feeling position of the appertaining feeler lever 409.

In the further course of the same machine run, the follower 75c selected by the depression of the "Meat" key operates to move the angular levers 61a and the gears 60, 306 so as to displace the slide bars 302, 303 in the rhythm of the operation "addition." Simultaneously the slide bar 322 moves in the same rhythm due to the action of follower 75c in conjunction with the angular lever 332 pinned to follower 75c, and the arms 325, 328 mounted on the switching shaft 324. Since in the normal condition of the machine the coupling levers 356, 357, 358 pivotally mounted on slide bars 302, 322 (FIGS. 2, 5) are kept by spring 378 in the switching position shown in FIG. 5, the displaced plus-minus mechanisms 386, 387 occupying the position selected in accordance with the operation "addition" are placed into meshing engagement with the gear segments 392. This is brought about by the fact that the slide bar 302, acting through the coupling lever 356, and the slide bar 322, acting through the coupling lever 358 (see FIG. 5), actuate the switching levers 336, 337 and the links 342, 343, to turn the bearing segments 344, 345 clockwise (FIG. 2). This motion is transmitted by means of the square portions of control shafts 382, 383 to these two shafts (FIG. 3) so that the knee-linkage arms 384, 385 (FIG. 4) are effective to also turn the plus-minus mechanisms 386, 387 clockwise (FIG. 4) about the pivots 382, 383 and into meshing engagement with the gear segments 392.

It will be apparent from the foregoing that the amount of $0.99 posted into the machine, aside from being entered into the adding mechanisms selected by key "B" and "Meat," is also entered through the respective positive counting gears 390 into the minus mechanism 386 and into the plus mechanism 387 of the balance computer. Since the minus mechanism 386 in its zero condition occupies on the positive side the position 999999, the entering of the amount of $0.99 causes a tens transfer in the highest digit position, namely an advance from position "9" to position "0." As a result, the cam 442 connected with the highest digit position and cooperating with the pin 444 of the switching lever 445 rotatably mounted on control shaft 382, turns the switching lever 445 clockwise. This also causes the bridge structure 446 (FIG. 4) to turn the switching lever 447 clockwise so that the extension 448 abuts against the stop pin 450 of the double-armed lever 451.

The machine main shaft 96, acting through follower 75c, the angular lever 61a, and the arms 325 and 328, returns the slide bars 302, 322 to the position illustrated in FIG. 5. During this return movement of bars 302, 322, the switching levers 336, 337 cooperate with links 342, 343 and bearing segments 344, 345 to turn the two mechanisms 386, 387 back to the normal position of rest illustrated in FIG. 4. Simultaneously, under the action of the already turned switching lever 447 resting with its extension 448 against the stop pin 450, the double-armed lever 451 is turned counterclockwise about its pivot 453 in opposition to the force of spring 456 (FIG. 4). Consequently, the lever 451, during counter-clockwise rotation, pulls the pull-rod 454 and the key-locking slider 205 (FIG. 2) in bank 1 downward. This places the projection 205a (FIG. 2) of locking slider 205 beneath the cross-pin 9 of the change key 6, whereas the sub-total key 5 previously blocked by the projection 205b of slider 205 is now released and, if necessary, can be depressed by the operator.

Shortly before termination of the machine run, the latch lever 435 is lowered onto the control levers 412, 413 (FIGS. 2, 3, 4) and thus turns the feeler levers 408, 409, connected with the control levers, out of the range of the plus-minus selector cam 420 in opposition to the bias of springs 410, 411.

The first amount-entering machine run is now completed, and the machine is ready for the posting of another amount-entering run. The amounts next to be registered, in addition to the entering operation described above, are to be posted into the keyboard of the machine by the clerk in accordance with any further sale items, and they involve the same individual operations within the machine as described in the foregoing.

A complete sequence of amount-entering machine runs (multiple items) must be concluded by drawing an intermediate balance, and this is done by actuation of the sub-total key 5. When the sub-total key 5 is being depressed, the cross-pin 9 of key 5 (FIGS. 2, 17) displaces the transfer slider 206 downwardly, and the pull rod 377, linked to slider 206, turns lever 376 and shaft 364 clockwise (FIGS. 2, 5). The angular lever 365 rigidly mounted on shaft 364 then acts upon links 367, 368 which impart clockwise rotation to the coupling lever 356 pivoted to the slide bar 302. Lever 365 also acts upon link 371 pivoted to the slide bar 322 and turns link 371 clockwise about its pivot 361 (FIG. 5). The coupling lever 357 pivoted to slide bar 302, and the coupling lever 358 pivoted to slide bar 322 participate in the just-mentioned motion, except that levers 357 and 358 are turned counter-clockwise about their respective pivots 362 and 363. This places the coupling lever 356 out of engagement with dog pin 340 and the coupling lever 358 out of engagement with the dog pin 341, while the coupling lever 357 connected with slide bar 302 is placed into active engagement with the dog pin 341 of switching lever 337.

Concurrently, the actuation of the sub-total key 5 operates transmission means (not illustrated) which turn the square shaft 67 (FIG. 2) and thus select the follower 75 that corresponds to the operation "sub-total." During the ensuing machine run, the side bar 302 and the coupling lever 357 cooperate with the switching lever 337 to turn only the plus mechanism 387, then in positive switching position, in to engagement with the gear segments 392, whereas the minus mechanism 386, now likewise in positive position, remains disengaged from the gear segments 392 because the coupling lever 356 is now in its inactive position. Since the further machine operations occurring during sub-totalizing operation are well known and their details not essential to the blocking apparatus according to the invention, they are not further described herein.

Figure 1:
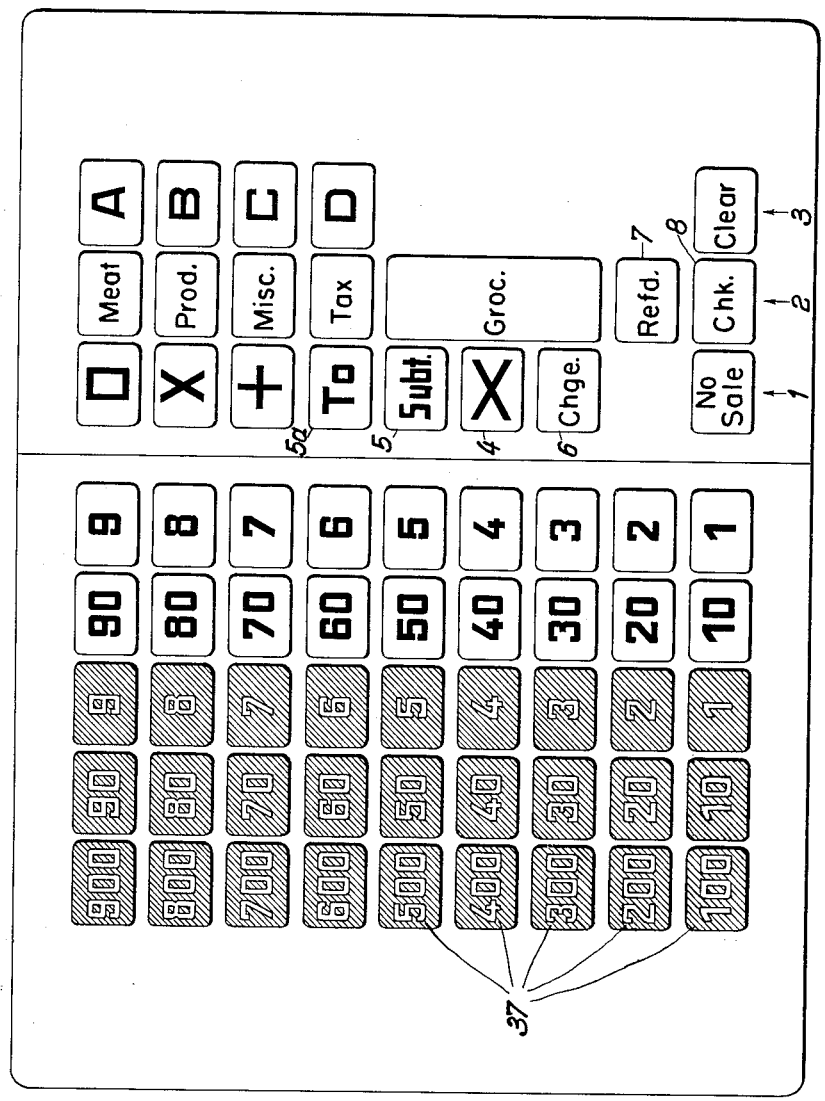
FIG. 1 shows the keyboard of the machine.

If one of the sold items of merchandise is taxable, then another machine run for registering the amount of tax must be released by depressing the "Tax" key in control-key row 2 (FIG. 1). Since this amount must be entered additively into the computing mechanisms of the machine, the machine run takes place in the same manner as described above with reference to the entering of amounts of sale. Consequently the coupling levers 356, 357, 358 occupy the normal position shown in FIG. 5.

In order to thereafter determine the amount registered in the machine, another sub-total is to be drawn which is again done by depressing the sub-total key 5. During such sub-totalling operation the coupling levers 356, 358 are turned out of the active position shown in FIG. 5 in the manner described above, whereas the coupling lever 357 abuts against the stop pin 341. The sub-totalizing run proceeds in the manner already described.

If the customer returns an empty bottle or other merchandise on which a refund is due, the amount to be refunded, for instance, $0.10, must be deducted from the total to be paid by the customer. Such deduction is automatically registered by means of another machine run which, after posting the amount of refund into the key field 37 of the machine, is released by actuation of the "Refund" key 7 (FIG. 1). Depression of key 7 has the effect of displacing the appertaining transfer slider 1207 (FIG. 15) of the operation-control bank 2. The displacement is imparted to a pull rod 425 which turns the shaft 422 (FIGS. 3, 4, 15, 18) and thus the plus-minus selector cam 420 counter-clockwise in opposition to the force of spring 423 to the negative selector position illustrated in FIG. 4. The control levers 412, released by the latch lever 435 at the beginning of the machine run, are turned clockwise about their pivot 407 by respective springs 410, 411 until the feeler levers 408, 409 abut against the contour step 421 of the plus-minus selector cam 420. As a result, the switching levers 412, 413 act with their respective fork-shaped openings 416, 417 upon the bridges 403, 404 and displace them on respective bearing members 400 and 401 toward the left relative to the illustration in FIG. 3, so that the bridge structures 403 and 404 enter into the swinging range of the extension 432a of the follower 432. Consequently, when follower 432 is being driven from the machine main shaft 96, the bridge structures 403 and 404 are turned clockwise about their pivot 395. The switching levers 397, 398 participate in this motion so that the control shaft 382 carrying the minus mechanism 386 is moved by means of bearing member 437 into the position shown in FIG. 3, while control shaft 383 carrying the plus mechanism 387 is displaced toward the right due to action of intermediate lever 439 and bearing member 440. Consequently, minus mechanism 386 and plus mechanism 387 now have their negative counting gears 391 in mesh with the respective gear segments 392. However, the coupling levers 356, 357, 358 remain in the position illustrated in FIG. 5. The further machine run, therefore, takes place in the same manner as described above for the machine run serving to enter a positive amount.

In order to register the final sales amount, another total must be drawn, and this is again done by actuating the sub-total key 5. As a result, the coupling levers 356, 358 are again turned into inactive position about their respective pivots 361 and 363, due to the fact that the pull rod 377 connected with the transfer slider 206 acts upon the angular lever 365 connected with the control shaft 364 (FIG. 5). At the same time, the coupling lever 357, which now is turned counter-clockwise about its pivot 362, enters into engagement with dog pin 341 switching lever 337. The further course of the machine run takes occurs in the manner already described.

The total amount now indicated by the machine, for instance $3.54, represents the balance to be paid by the customer. If this amount is paid by a check made out, for instance, for $10.00, then the cashier posts this amount into the keyboard field 37 of the machine and releases another machine run by depressing the check key 8 (FIGS. 1, 15). This amount must be entered in the negative sense for the purpose of determining the difference between the payable amount and the amount of the check. For that reason, the release by means of the check key 8 has the effect of setting the plus-minus selector cam 420 in the same manner as described above with reference to the run released by the "Refund" key. Also as described, the switching levers 412, 413 and the appertaining feeler levers 408, 409 now operate to scan the setting of the plus-minus selector cam 420 with the result of displacing the plus mechanism 487 and the minus mechanism 486 into negative positions so that now the negative counting gears 391 are in mesh with gear segments 392. When the posted amount is being entered into the minus mechanism 486, another tens transfer occurs in the highest digit position of the minus mechanism corresponding to the exemplified $10.00 amount of the check. This turns the cam 442 back to the position illustrated in FIG. 4 so that the switching levers 445, 447 and the extension 448, under their own weight, swing out of the range of dog pin 450 of lever 451. During the clearing of the keyboard, effected in the further course of the machine run by means of the clearing shaft 77, the key locking slider 205, linked by pull rod 454 with lever 451, is thus returned by spring 456 to the position shown in FIG. 2. Consequently, the projection 205a (FIG. 2) of slider 205 is now displaced out of the range of cross pin 9 on change key 6, whereas the sub-total key 5 is again blocked by the projection 205b of the locking slider 205.

After this machine run is completed, the cashier can determine the amount of change to be paid to the customer, by depressing the change key 6 which releases another machine run. By means of pull rod 426 (FIGS. 2, 16), acting in opposition to spring 423, the plus-minus cam 420 is so displaced that the feeler lever 408 can cooperate with the stepped contour portion 421, and the feeler lever 409 with the outer periphery of the plus-minus selector cam 420 (FIG. 18). The levers 412 and 413, released by latch lever 435 at the beginning of the machine run, follow the biasing force of their respective springs 410, 411, and turn clockwise about their pivot 407 (FIG. 3), while the lever 413 turns the bridge structure 404 into the range of the lateral dog pin 431 of control shaft 430. While the follower 432 is being driven from the machine main shaft 96, the bridge structure 403 and the switching lever 398 connected therewith, as well as the intermediate lever 439, are turned into the position illustrated in FIG. 3. As a result, the positive counting gear 390 of the plus mechanism 487 enters into the meshing range of the gear segments 392, whereas the minus mechanism 486 remains in the position shown in FIG. 3.

Since the actuation of the change key 6 does not affect the condition of control shaft 364 (FIG. 5), the spring 378 was active during the above-mentioned occurrences to place the coupling levers 356 and 358 into engagement with the respective dog pins 340 and 341. Simultaneously, the actuation of the change key 6 had the effect of selecting, by a suitable mechanical connection (not illustrated) including the square shaft 64, the one follower 75 that is assigned to the operation "total balance." Therefore, the slide bars 302, 303 are moved by means of lever 61a and gears 60, 306 in the rhythm of the operation "total." Accordingly, the slide bar 302 causes the appertaining coupling lever 356 to couple the minus mechanism 386 with the gear segments 392 so that a genuine negative sum is drawn from the minus mechanism, this sum being the amount of change, in the present case $6.46, to be returned to the customer.

In accordance with the arrangement of the slide bar 322 which, by virtue of lever 332 and switching levers 325 and 328, moves in the sense of the operation "addition," the sum drawn from the minus mechanism 386 is subsequently entered into the plus mechanism 387 in the positive sense during the return movement of the gear segments 392. This has the effect of resetting the negative side of the minus mechanism 486 as well as the positive side of the plus mechanism 487 back to zero, so that in the final condition reached by the cash register, the minus mechanism occupies on its positive side (gear) 390 the original position 999999, and the plus mechanism on its positive side (gear) 390 occupies the original position 000000.

The amount of $6.46 appearing in the indicating device of the cash register is identical with the amount of change to be paid by the cashier to the customer and hence can be directly read off. All amounts posted into the machine, as well as the intermediate sums (sub-totals), and the final sum as well as the amount of change to be paid back to the customer, are printed upon the record tape produced in the machine in the conventional manner and illustrated, by way of example, in FIG. 6, so that an accurate supervision and auditing of the business transactions is secured.

The above-described example of operation shows that when the sales item first posted into the machine is being registered, the occupied minus mechanism 386 performs a tens transfer in its highest digit position on the positive side and thus causes the change key 6 to be locked and the sub-total key 5 to become unlocked. The same locking and unlocking operation is also obtained when a smallest possible amount is entered in the positive sense because even the entering of an amount of $0.01 already effects a tens transfer of all digits 999999 up to the highest digit position 000000 on the positive side of the minus mechanism.

Consequently, the cam 442 (FIG. 4), turning one division counter-clockwise, swings the switching lever 445 clockwise so that the extension 448 abuts against the stop pin 450 and thus causes the change key 6 to be blocked. The turning motion of the double-armed lever 451 effected by the minus mechanism becoming disengaged from the gear segments 392, and therewith also the locking of the change key 6 by slider 205, is eliminated during a machine run, namely, when the minus mechanism is placed into meshing engagement with the gear segment 392. This lapse of the blocking effect, however, is without any influence upon the servicing of the machine by the cashier because all keys on the keyboard of the machine are anyhow blocked as long as a machine run is in progress, such blocking of all keys being effected in the conventional manner by rotary movement of the clearing shaft 77 (FIG. 2). Shortly before termination of the machine run, the minus mechanism is again moved into zero position so that the change key 6 is again blocked.

It is further apparent from the foregoing that, since the locking of change key 6 is controlled by the minus mechanism 486, the change key will not be locked if all positive and negative values entered into the minus mechanism add up to zero, because the minus mechanism then occupies its starting position. This will be more fully described presently.

Figure 6:
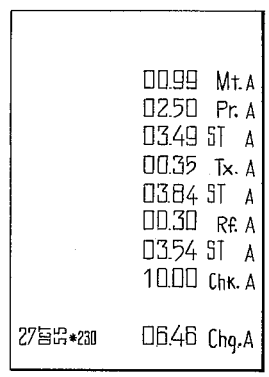
FIG. 6 shows an example of a check slip issued by the machine when using the device for calculating the amount of change.

During the last sub-totalizing operation of the above-mentioned example of transactions, the positive side of the plus mechanism 487 is charged with an amount of $3.54 (see also FIG. 6).

As mentioned, the positive side of the minus
  mechanism 486, when in zero position,
  shows _____ 999999
To which is added the amount of _____ +354
                                          _____
Whereafter the amount _____ 000353
  is shown on the positive side of the minus
  mechanism. (The tens transfer extending
  through all digits causes the above-described
  locking of the change key 6.)
Consequently, the negative side of the minus
  mechanism 386 now shows the complemen-
  tary value _____ 999646
When on the negative side of the minus mech-
  anism 386, the amount corresponding to the
  total sales price, namely _____ 354
Is entered (which also is entered on the negative
  side of the plus mechanism), then the negative
  side of the minus mechanism shows _____ 000000
And hence the positive side of the minus mech-
  anism shows _____ 999999

The cam 422, therefore, is turned back into the zero position illustrated in FIG. 4.

Now, in the above-described example of a business transaction, the customer has paid by check in the amount of $10.00.

The plus side of the minus mechanism 386
  showed _____ 999999
                                         +354
                                         _____
                                         000353
Consequently, the minus side of the minus
  mechanism shows the complementary value __ 999646
After entering the amount of the check on the
  negative side of the minus mechanism _____ −1000
                                         _____
(which is also entered on the negative side
  of the plus mechanism), the minus mech-
  anism shows _____ 000646

The latter amount is the amount of change resulting from the grand-totalizing operation on the negative side of the minus mechanism. Simultaneously, there again occurs a tens transfer which extends up to the highest digit position of the minus mechanism, so that the locking of change key 6 becomes ineffective.

The operations of the plus mechanism 387 occur in a manner analogous to those described with reference to the minus mechanism, with the exception that the final total appearing on the negative side of the minus mechanism is added into the positive side of the plus mechanism 387 in order to set the plus mechanism likewise back to the zero condition.

Figure 9:
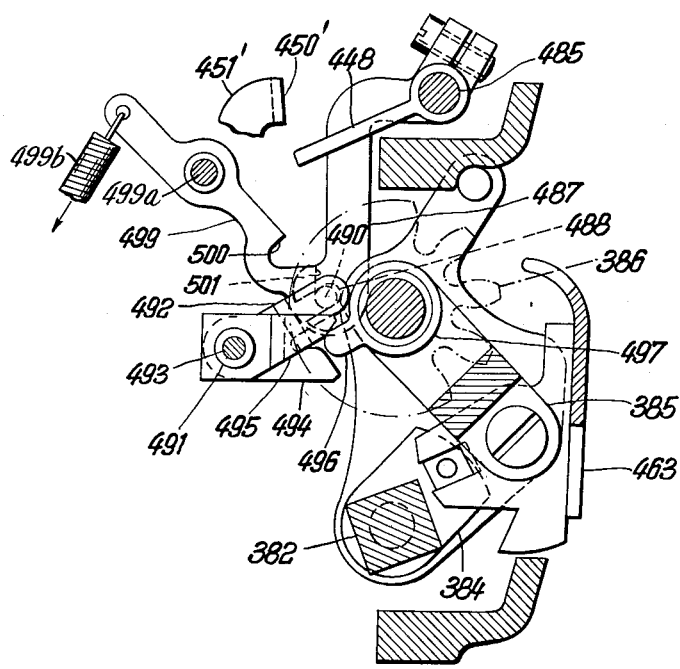
FIG. 9 illustrates partly in section a side view of the switching means appertaining to the highest negative value position of the balance totalizing device according to FIG. 7.

The described blocking of sub-total key 5 and change key 6 is also obtainable when using a genuine balance-computing mechanism, i.e. an add-sub mechanism with a device for switching the "escaping one." An embodiment exemplifying such a design is illustrated in FIGS. 7, 8 and 9. Used as a balance-computing mechanism is a known add-sub mechanism 386 already mentioned with reference to the embodiment previously described. As described, the add-sub mechanism 386 has for each digit position a positive counting gear 390 and a negative counting gear 391 which are selectively placed into meshing engagement with the gear segments 392 (FIG. 3) in the positive or negative coupling positions respectively of the mechanism. The devices for tens transfer and for transfer of the "escaping one" are well known as such and will be described below only in conjunction with the present invention.

It will be understood that aside from the modifications described below with reference to FIGS. 7 to 9, the machine may otherwise correspond to the one described in the foregoing with reference to FIGS. 1 to 6.

The above-mentioned add-sub mechanism 386 is mounted on a frame structure 388 (FIG. 7) which is loosely seated upon the control shaft 382 and carries two aligned pivot pins 460 on which a feeler frame 461 is rotatable. The feeler frame 461 carries respective feelers 464 for each of the digital value positions of the balance-computing mechanism. The feelers are biased by respective springs 462 toward tens-transfer disks 466 which are correlated to the positive counting gears 390 of the computing mechanism. Under the bias of spring 462 the respective feelers 464 enter into notches 465 (FIGS. 7, 8) of the tens-transfer disks if all positive counting gears 390 of the computing mechanism are in the position 000000. A latch bracket 463 prevents the individual spur gears 390, 391 from rotating (FIG. 8) in the inactive position of the computing mechanism; but when the computing mechanism is moved into its active position illustrated in FIG. 9, then the latch bracket 463 is disengaged from the counting gears 390, 391 and turns the feeler frame 461 into its inactive position (FIG. 9). A dog pin 467 (FIG. 7), firmly secured to a side wall of feeler frame 461, passes through a slot 468 of a latch lever 469 pivotally mounted on the side wall 375 (not shown in FIG. 7 but corresponding to side wall 375 in FIG. 3). The latch nose 470 of latch lever 469 cooperates with a lever 451, which in the illustrated example is shown to have three arms and is likewise pivotally mounted on the above-mentioned side wall 375. When lever 469 is in latching engagement, its latch nose 470 catches behind a latch pin 471 of lever 451. Instead of the pin 450 shown in FIG. 4, the lever 451' in FIGS. 8 and 9 is provided with a lateral lug 450' which can cooperate with a dog pin 448 controlled by the highest negative digit position of the computing mechanism.

A linking rod 472 connects the three-armed lever 451 with an angular lever 474 pivoted on a shaft 473 (FIG. 7). Lever 474 carries a slide pin 476 which extends through a slot 475 of a pull rod 454' (corresponding to the pull rod 454 in FIG. 4). A spring 456' holds the lever 474 with pin 476 against the upper end of slot 475 so that lever 474 and pull rod 454' are in force-constrained connection with each other. The pull rod 454', as described above with reference to rod 454, is linked to the key blocking slider 205 (FIG. 7) which releases and locks the change key 6 and the sub-total key 5.

A cam disk 482 with a cam recess 481 is mounted on a control shaft 480 (FIG. 7) and cooperates with a cam roller 483 journalled on the angular lever 474. A spring 484 has one end stationarily attached and the other hung into an eye of lever 474 to continuously urge roller 483 toward the cam contour of disk 482. The control shaft 480 serves to effect staggered tens-transfer in the well-known manner which need not be further described because it is non-essential to the present invention proper, it being sufficient to mention that the control shaft 480 performs a single full revolution during each individual machine run, and occupies the position illustrated in FIG. 7 when in the normal position of rest. The switching pin 448 is firmly secured to a shaft 485 revolvably mounted in and between the side walls 375 and 379 (see FIG. 3). The shaft 485 also carries an arm 487 (FIG. 9). Arm 487 has a recess 488 which straddles a coupling pin 490 riveted into a lever 492 secured to a sleeve 491. Sleeve 491 is revolvable on a shaft 493 and is rigidly connected with two dog projections 494, 495 which selectively cooperate with a lug 496 on a control disk 497 correlated to the highest negative digit position of the balance-computing mechanism. A catch lever 499 pivoted at 499a and biased by a spring 499b has two catch recesses 500 and 501 which, by straddling the pin 490, limit the movement of arm 487 between two definite switching positions.

During tens transfer in the highest digit position of the computing mechanism, the lug 496 acts upon lug 494 or 495, depending upon whether the computing mechanism is displaced to positive or negative coupling position, and turns the pin 490 either from catch recess 501 to recess 500, or vice versa. As a result the arm 487 turns accordingly. This places the switching pin 448 either into, or out of the range of the lateral lug 450' on lever 451', as the case may be.

For more fully understanding the operation of the modification described with reference to FIGS. 7 to 9, assume for instance that, when the last machine run was performed, the amount of the check paid by the customer exceeded the total sales balance so that the final amount must be drawn from the negative side (counting gear) 391 of the balance-computing mechanism. Under these conditions, the latch lever 469 occupies the position 478 shown by dot-and-dash lines in FIG. 7.

In the stand-still condition of the machine, therefore, the negative side (counting gear) 391 shows _____ 000000
And the positive side (counting gear) 390 shows 999999

If the amount of, for instance. $0.01 is entered in the manner explained with reference to the embodiment first described, then after transferring this amount to the computing mechanism, the positive side shows_____ 000001
And the negative side shows the complementary value _____ 999998

Consequently, in the highest digit position of the balance-computing mechanism, there occurs a tens transfer, whereby the lug 496 is moved to the position illustrated in FIG. 9. As a result, the dog 494 is turned counter-clockwise about its pivot 491 and thus acts through lever 492 to turn the pin 490 into the recess 501 of catch lever 499. This also displaces the arm 487 counter-clockwise about its pivot 485 to the position illustrated in FIG. 9; and the switching pin 448 then occupies the position also illustrated in FIG. 9.

At the termination of the machine run, the balance-computing mechanism is swung back to its inactive position as described with reference to the first-mentioned embodiment. At the same time, the control shaft 480 (FIG. 7) has completed its single revolution so that it occupies the position shown in FIG. 7. Now the spring 484 tends to turn the lever 474 clockwise about the pivot 473. Since the tens transfer in the highest digit position of the balance-computing mechanism has caused the switching pin 448 to turn to the position shown in FIG. 7, pin 448 is no longer located in the swinging range of lug 450' on lever 451'. Hence, lever 474 can now follow the force of spring 484 and turns clockwise about its pivot 473. This causes the link 474 to turn the lever 451 clockwise about its pivot 453. As a result, the coupling pin 476 and the pull rod 454 shove the key blocking slider 205 upward (FIG. 7), so that the slider projection 205a moves beneath the cross pin 9 of the change key 6. Now the change key 6 is blocked, whereas the sub-total key 5 is released by the slider 205 and can be actuated for drawing a sub-total.

Disregarding any other machine runs that may have to be performed for a particular series of business transactions, assume that the amount of $0.01 registered in the machine is paid for by the customer by exactly the same amount of $0.01.

After entering this amount into the balance-computing mechanism under control by the key 8 (FIG. 1)_____ 000001
 − 1
The positive side again shows_____ 000000
And the negative side shows the complement___ 999999

Consequently, no tens transfer has taken place in the highest digit position of the balance-computing mechanism. In order to prevent that the change key 6, to be actuated for registering the total balance, becomes blocked at the end of the machine run, the above-described feeler frame 461 is now effective as follows. As mentioned, the tens transfer disks 466 correlated to the positive counting gears 390 of the balance-computing mechanism have respective notches into which the feelers 464 of feeler frame 461 can enter only when all positive counting gears 390 are in the position 000000. As the example just described will show, the positive counting gears 390 of the balance-computing mechanism actually occupy the position 000000 after the amount of $0.01 paid by the customer has been entered. Consequently, when the balance-computing mechanism is moved to its position of rest, the springs 462 can turn the feeler frame 461 counter-clockwise about pivot 460 until the feelers 464 abut against the bottoms of the respective notches 465 in the tens-transfer disks 466. At the same time, the pin 467 turns the lever 469 counter-clockwise, so that the latch nose 470 is placed into the position shown in FIG. 7 and catches behind the latch pin 471 of lever 451'. It will be remembered that after termination of the machine run, the cam disk 482 occupies the position shown in FIG. 7. Although the switching pin 448 still retains the position illustrated in FIG. 7, the spring 484 cannot turn the lever 474 and thus, through link 472, the lever 451 in the clockwise direction, because such motion is prevented by the nose 470 of latch lever 469. Consequently, the key-locking slider 205 also remains in the position shown in FIG. 7 so that the change key 6 can be actuated for releasing the total-balance machine run.

If, for instance, another amount-entering machine run has been released for again registering the amount of $0.01, then this amount is entered on the positive side 390 of the balance-computing mechanism.

The positive side of the balance-computing mechanism, therefore, has the position_____ 000001
And the negative side shows accordingly_____ 999998

Consequently, a tens transfer in the highest digit position of the mechanism has not taken place. When, near the end of this machine run, the computing mechanism is turned back to its position of rest, the springs 462 again tend to turn the feeler frame 461 to the position shown in FIG. 7. However, since in the lowermost digit position, the positive counting gear is displaced one value step corresponding to the entered amount of $0.01, such motion is prevented by the displaced tens-transfer disk, so that the switching pin 467 holds the latch lever 469 in its inactive position (dot-and-dash lines) 478. After the tens-transfer control shaft 480 has resumed its position of rest according to FIG. 7, the spring 484 can become active to turn the angular lever 474 and, through link 472, also the lever 451 clockwise about the respective pivots 473 and 453. Consequently, the pull rod 454' moves the locking slider 205 into its active position so that the projection 205a of slider 205 blocks the change key 6.

Now assume that the amount of $0.01, registered by drawing a sub-total, is to be paid for by the customer in form of a credit coupon in the value of $0.02. After the amount of $0.02 has been entered into the negative side of the balance-computing mechanism in the manner described with reference to the first-mentioned embodiment, the positive side of the balance-computing mechanism is in the position 999998, and the negative side in the position 000001, so that a tens-transfer has taken place in the highest digit position of the mechanism. Accordingly, the dog 496 has turned the dog 495 (FIG. 9) and thus also the lever 492 with pin 490 in the counter-clockwise direction, so that pin 490 is located in recess 500 of catch lever 499. As a result, the arm 487 is likewise turned counter-clockwise about its pivot 485 so that the switching 448 is turned into the range of lug 450'.

When, near the end of the machine run, the balance-computing mechanism, as already described, is moved to its position of rest, then the springs 462 tend to shift the feeler frame 461 to the position shown in FIG. 7. Such motion, however, is impossible because of the now unsuitable setting on the positive side of the balance-computing mechanism, so that the latch lever 469 remains in its ineffective (dot-and-dash) position 478. After the control shaft 480 has returned to its position of rest shown in FIG. 7, the springs 484 tend to turn the angular lever 474 and, through link 472, also the lever 451 clockwise about their respective pivots 473, 453. However, due to the tens-transfer which occurred in the highest digit position of the computing mechanism, the switching pin 448 is now in its active position, so that the lug 450 of lever 451 is stopped by the switching pin 448. Consequently, the angular lever 474 cannot move in the clockwise direction so that the key-blocking slider 205 remains in the inactive position illustrated in FIG. 7. As a result, the change key 6 is actuable, and the cashier can release a machine run for determining the amount of change to be paid to the customer.

In summary, it will be recognized from the embodiment described with reference to FIGS. 7 to 9, that an alternating blocking of change key 6 and sub-total key 5 in the manner set forth with reference to the embodiment first described, is also applicable when using a genuine balance-computing mechanism, i.e. an add-sub mechanism with a device for switching the "escaping one."

Figure 5A:
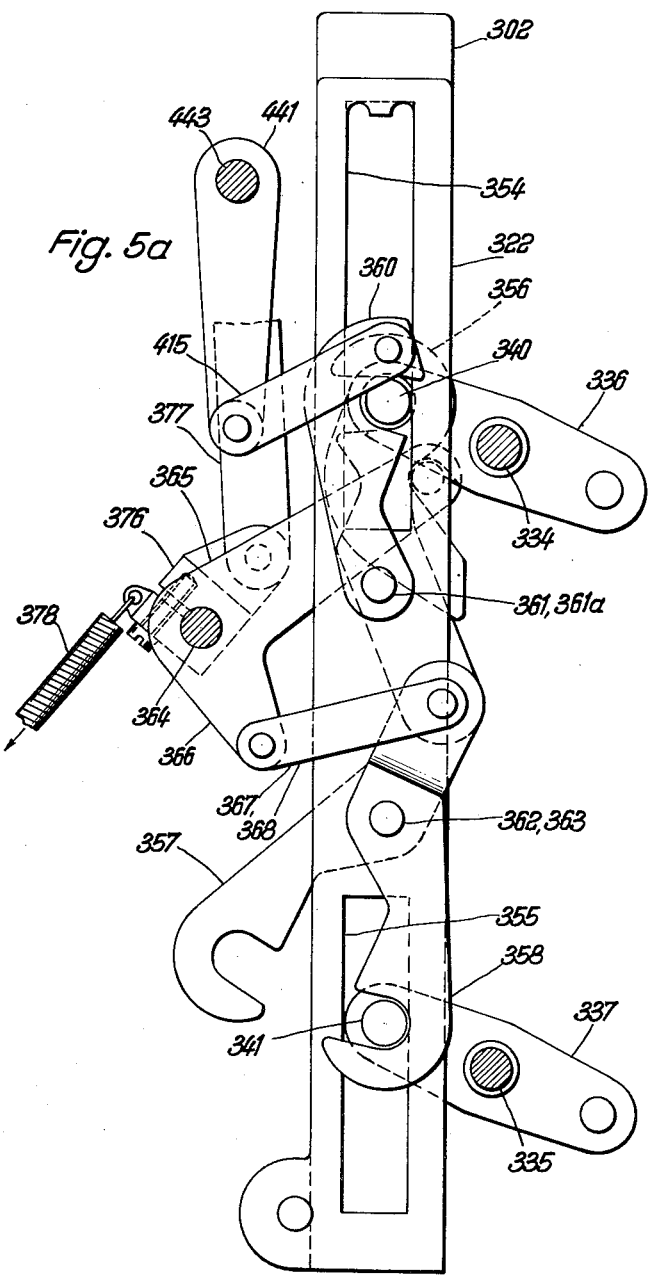
FIG. 5a shows a modified design of the devices illustrated in FIG. 5.

According to a modified embodiment of the invention, generally similar to that described above with reference to FIGS. 1 to 5, a second lever 459 is firmly connected with the control shaft 453 (FIG. 4) and carries a coupling pin 452a which passes through an elongated slot 479 near one end of a pull rod 455. The other end of pull rod 455 has a pivot pin 414 linked to a clamping arm 449 secured to a control shaft 443 (FIGS. 4, 5a). Rigidly joined with control shaft 443 is an arm 441 (FIG. 5a) which is particularly joined by a link 415 with a coupling 360 pivotally mounted on a pin 361a. A spring (not illustrated) tends to hold the coupling lever 360 in the position shown in FIG. 5a. The operation control keys of row 1 (FIG. 1) cooperate by means of their respective cross pins 9 (FIG. 2) with a key-blocking slider 205 according to FIG. 10, which is connected through the pull rod 455 (see FIG. 4) with the double-armed lever 451 mounted on control shaft 453 and biased by a spring 456.

The supplemental mechanism components just described serve for controlling the balance-computing mechanism, composed of two add-sub mechanisms, when a registering operation is terminated without the use of the change-computing device. That is, the supplemental components enter into action when the customer pays an amount exactly equal to the total balance due.

Assume that the proper salesman identifying key (A, B, C, D) in row 3 (FIG. 1) has been depressed and that the sales amount, for instance $2.00, has been posted on the keyboard field 37 of the machine. If now a machine run is released by depressing a selected key of bank 2, for instance the key "Produce," then the amount posted into key field 37 is entered in the well-known manner into the correspondingly selected adding mechanism. Simultaneously, the switching levers 412, 413, biased by their respective springs 410, 411 (FIG. 4), are active to feel the plus-minus selector cam 420 on shaft 422, which cam is now in its positive position. As a result, the feeler levers 408, 409 move clockwise about their pivot 407 until they are stopped by the contour of cam 420. As a result of such feeler operation, the minus mechanism 386 as well as the plus mechanism 387 are displaced so that their positive counting gears 390 are in meshing range of the gear segments 392 (FIG. 3). Now, the coupling levers 356, 358, 360 (FIG. 5a) and the switching levers 336, 337 act in the above-described manner upon the add-sub mechanism 386, 387 and place them into engagement with the switching segments of the machine under control by the slide bars 302, 322 which are being moved up and down by means of the machine main shaft 96.

Consequently, the amount of $2.00 posted into the machine is also entered into the positive sides of the plus mechanism and minus mechanism respectively. Since the positive side of the minus mechanism 386 when in starting position shows 999999, the entering of the just-mentioned amount effects a tens transfer in the highest digital value position, namely a movement from the value "9" to the value "0." Simultaneously, as already described, the cam 442 connected with the highest digit position cooperates with the pin 447 of the switching lever 445 rotatably mounted on control shaft 382 with the effect of turning the switching lever 445 clockwise. By means of the switching bridge 446, the switching lever 447 is also turned clockwise so that the extension 448 abuts against the stop pin 450 of the double-armed lever 451. Shortly prior to termination of the machine run, as generally known, the previously coupled add-sub mechanisms are reset to their inactive position of rest. During such resetting movements, the previously displaced switching lever 447, resting with its extension 448 against the pin 450, turns the double-armed lever 451 counter-clockwise about its pivot 453 in opposition to the force of spring 456, so that lever 451 moves the pull rod 457 downward. This also imparts downward displacement to the slider 205 (FIG. 10) of the control-key bank 1. The projection 205a of slider 205 is thus placed beneath the cross pin 9 of change key 6, whereas the sub-total key 5 previously blocked by projection 205b and the total key 5a previously blocked by projection 205c of key slider 205 are now actuable.

During the counter-clockwise movement of the double-armed lever 451 the simultaneous movement of lever 459 remains without effect upon the pull rod 455 (FIG. 4) because the coupling pin 452a of lever 459 can freely move within the elongated slot 479 of pull rod 455.

The first amount-entering machine run is now terminated. All movable components occupy the positions illustrated in FIGS. 4 and 5a so that a series of new amount-entering machine runs can be performed.

Any series of such amount-entering machine runs must be terminated by a sub-total machine run which is released by actuating the sub-total key 5. When depressing the sub-total key, the appertaining cross pin 9, which since posting of the first item has occupied the position denoted by 9a (dot-and-dash circle) in FIG. 10, cooperates with the slanting surface of projection 205b and thus displaces the slider 205 downward (FIG. 10).

The downward displacement of slider 205 causes the pull rod 454 to turn the double-armed lever 451 (FIG. 4) counter-clockwise about its pivot 453. The lever 459 on control shaft 453 participates in this motion and turns the control shaft 443 clockwise by means of pull rod 455 and clamping arm 449. The switching lever 441, rigidly connected with control shaft 443, acts through link 415 to turn the coupling lever 360 counter-clockwise about its pivot 361a. This moves the coupling lever 360 out of engagement with dog pin 340.

Simultaneously with the above-described operations, the depressing movement of the sub-total key 5 causes downward displacement of transfer slider 206 (FIG. 17) which is connected with the pull rod 377 (FIG. 5a) and thus causes pull rod 377 to turn lever 376 and shaft 364 clockwise. An angular lever 365 pinned to shaft 364 has an arm 366 pivotally connected with two links 367, 368. During the just-mentioned clockwise rotation of shaft 364 the links 367, 368 turn the coupling lever 356 clockwise about the pivot pin 361 which fastens the coupling lever 356 to the slide bar 302. A similar motion is simultaneously imparted to the coupling lever 357 pivoted to the slide bar 302, and to the coupling lever 358 pivoted to the slide bar 322, except that the coupling levers 357 and 358 are turned counter-clockwise about their respective pivots 362 and 363. This places the coupling levers 356 and 358 out of engagement with the respective dog pins 340 and 341, while the coupling lever 357 on slide bar 302 enters into active engagement with the dog pin 341 of the switching lever 337.

Since, as described, positive sums are to be found on the positive side of the plus mechanism, the ensuing machine run, corresponding to the selected operation "sub-total," has the effect that the slide bar 302 and the coupling lever 357 when cooperating with the switching lever 337, shift only the plus mechanism (gears 390 of mechanism 387 in FIG. 3), now in positive position, into meshing engagement with the gear segments (392 in FIG. 3) of the machine. In contrast thereto, the minus mechanism 386, now likewise in its positive position, remains inactive because the appertaining coupling levers 356, 360 are now turned to inactive position. Since the further operations occurring when a sub-total is drawn, are generally known, they are not described in further detail.

After termination of the sub-totalizing operation, the slider 205 (FIG. 10) in the control-key bank 1 is moved by spring bias back to its previous position so that the slider projection 205a again blocks the change key 6 while the sub-total key 5 and the total key 5a are actuable. At the same time, the coupling lever 360, under the effect of a biasing spring (not illustrated), is returned to the active position illustrated in FIG. 5a, due to the action of the chain of members 459 (FIG. 4), 455, 449, 443 (FIG. 5a), 441, 415. The pull rod 377 (FIG. 5a), following the upward return displacement of the key slider 206 (FIG. 17) to which that pull rod is connected, is likewise reset to its original position so that the spring 378 turns the coupling levers 356, 357, 358 back into the position illustrated in FIG. 5a. The amount now indicated by the machine, for instance $9.00 (FIG. 11), represents the sales amount to be received from the customer. If the customer pays an accurately counted amount of $9.00, then, according to the invention, the machine performance can be directly terminated by actuating the total key 5a without using the device for the calculation of change.

As explained, positive sums are to be found on the positive side of the plus mechanism. Accordingly, the ensuing machine run must again call upon the positive side of the plus mechanism and simultaneously, in accordance with the character of the final balance to be registered by the machine, the amount determined from the positive side of the plus mechanism must be added on the negative side of the minus mechanism in order to set the two add-sub mechanisms of the computer back to the original starting position.

Consequently, when the business transaction is terminated by actuation of the total key 5a, then, in accordance with the selected operation "total," the transfer slider 1206 (FIG. 16) and the pull rods 425 and 426, cooperating through pin 427 (FIG. 4) with the plus-minus cam 420, set this cam to such a position that the feeler lever 408 can cooperate with the stepped contour portion 421 whereas the feeler lever 409 coacts with the outer contour portion of cam 420 (FIG. 18). Under the action of the switching levers 412, 413, therefore, the feeling-off of the plus-minus electro cam 420 has the effect of shifting the positive counting gears 390 of the plus mechanism 387 and the negative counting gears 391 of the minus mechanism 386 into the meshing range of the respective gear segments 392 of the machine (FIG. 3).

As mentioned, the actuation of the total key 5a has the simultaneous effect of displacing slider 206 (FIG. 17) and the pull rod 377 (FIG. 5a) so that coupling levers 356, 358 are moved to inactive positions, and coupling lever 357 is moved to active position. In the further course of the machine run, and in accordance with the selected operation "total," the slide bars 302, 322 (FIG. 5a) are moved in the rhythm of the operation "total" so that, by means of the coupling levers 360, 371 and the coupling levers 336, 337, both add-sub mechanisms 386, 387 are sequentially placed into meshing engagement with the gear segments 392 of the machine. As a result, the amount contained on the positive side of the plus mechanism 387, for instance $9.00, is taken off and is transferred to the printing and indicating devices of the machine and is subsequently added on the negative side of the minus mechanism 386.

Consequently, when the machine has reached the final condition, the minus mechanism 386 occupies on its positive side again the position ____ 999999
And the plus mechanism 387 shows on its positive side _____ 000000

The switching members 445, 446, 447 controlled by the cam 442 (FIG. 4) are simultaneously moved back to the zero position. The spring 456, acting through lever 461 and pull rod 454, resets the key slider 205 to the position illustrated in FIG. 10 so that the change key 6 is actuable, whereas the sub-total key 5 and the total key 5a are again blocked. The printed check tape issued by the machine as a result of the just-described operation may have the appearance illustrated in FIG. 11.

In contrast, if, after registering the last sub-total, the machine indicates an amount, for instance $3.54 (see FIG. 6), and the customer pays by a $10.00 bank note, then the check key 8 (FIG. 1) is to be depressed by the clerk. This releases the operations, already described in detail, required for indicating the amount of change to be paid to the customer; and the series of operations is thereafter terminated by depressing the change key 6, also as described. The record tape issued in this case by the machine may then have the appearance mentioned further above and shown in FIG. 6.

In summary, when for a composite business transaction comprising several individual items, the total amount of balance has been drawn and has been paid for by an amount of money equal to the balance, then the clerk terminates the entire transaction by depressing the "total" key (5a in FIG. 1) without the necessity for computing an amount of change; whereas when the amount paid by the customer differs from the balance to be received the clerk actuates the "change" key (6) to effect computation of the change by the machine.

It will be recognized that the blocking of the motor-releasing "change" key (6) according to the invention not only relieves the clerk of any calculating work but also facilitates the use of the machine because, aside from eliminating the necessity for comparison of amounts by the clerk, the proper control of the machine is made more fool-proof by automatically preventing an untimely or improperly sequenced actuation of the control keys within the course of the transactions.

It will be understood by those skilled in the art, upon a study of this disclosure, that our invention permits of various modifications as regards details of the individual machine components, as well as with respect to their mutual arrangement within the machine, without departing from the essential features of our invention and within the scope of the claims annexed hereto.

We claim:

1. In a business machine for registering single and multiple item transactions, totals of such transactions, the amount tendered by the customer to pay for the purchases, and computing and indicating the amount of change due the customer, said amount of change constituting the difference between the amount of the purchases and the amount tendered; the combination of a balance totalizer; amount-posting keys having transfer sliders for transferring amounts posted to said totalizer in an additive and subtractive sense respectively; a plus-minus selector cam rotatable into a plurality of positions including positive selecting, negative selecting, and totalizing selecting positions, feeler lever means engageable with said selector cam for sensing the position thereof, and a totalizer shifting mechanism actuable by said feeler lever means for displacing said totalizer mechanism into respective additive, subtractive and totalizing positions, a plurality of release keys to control the respective positions of said selector cam and including a sub-totalizing key, a payment-received key and a change-registering key; said sub-totalizing key being operably linked to said selector cam and said shifting mechanism so as to release a machine run to draw a sub-total in said totalizer of all items positively and negatively entered previously into said totalizer by said amount-posting keys; said payment-received key being operably linked to said selector cam and said shifting mechanism for causing the amount tendered, after being posted on said posting keys, to be entered into said balance totalizer; and said change-registering key being operably linked with said selector cam and said shifting mechanism to draw in said balance totalizer the difference between said sub-total and said amount tendered, whereby said amount of change is computed.

2. In a business machine for registering single and multiple item transactions, totals of such transactions, the amount tendered by the customer to pay for the purchases, and computing and indicating the amount of change due the customer, said amount of change constituting the difference between the amount of the purchases and the amount tendered; the combination of a balance totalizer; amount-posting keys having transfer sliders for transferring amounts posted to said totalizer in an additive and subtractive sense respectively; a plus-minus selector cam rotatable into a plurality of positions including positive selecting, negative selecting, and totalizing selecting positions, feeler lever means engageable with said selector cam for sensing the position thereof, and a totalizer shifting mechanism actuable by said feeler lever means for displacing said totalizer mechanism into respective additive, subtractive and totalizing positions, a plurality of release keys to control the respective positions of said selector cam and including a sub-totalizing key, a payment-received key and a change-registering key; first means under control of said sub-totalizing key and operably linked to said selector cam and said shifting mechanism for drawing a sub-total in said totalizer of all items positively and negatively entered previously into said totalizer by said amount-posting keys; second means under control of said payment-received key and linked to said selector cam and said shifting mechanism for causing the amount tendered, after being posted on said posting keys, to be entered into said totalizer; and third means under control of said change-registering key and operably linked with said selector cam and said shifting mechanism to draw in said totalizer the difference between said sub-total and said amount tendered, whereby said amount of change is computed.

3. In a business machine for registering single and multiple item transactions, totals of such transactions, the amount tendered by the customer to pay for the purchases, and computing and indicating the amount of change due the customer, said amount of change constituting the difference between the amount of the purchases and the amount tendered; the combination of a balance totalizer comprising an add-subtract computer assembly; amount-posting keys for posting positive and negative amounts into said computer assembly, said computer assembly having plus and minus portions axially displaceable to register positive and negative values and displaceable into positive balance condition corresponding to algebraic sub-totals and totals of the positive and negative amounts posted therein from said amount-posting keys; a plus-minus selector cam rotatable into a plurality of positions including positive selecting, negative selecting, and totalizing selecting positions, feeler lever means engageable with said selector cam for sensing the position thereof, and a totalizer shifting mechanism actuable by said feeler lever means for displacing said totalizer mechanism into respective additive, subtractive and totalizing positions; transmission means first connecting said computer assembly with said amount-posting keys for displacing said assembly in a positive additive sense and secondly connecting said amount-posting keys with said computer assembly for displacing said assembly in a negative subtractive sense; a plurality of release keys to control the respective positions of said selector cam and including a sub-totalizing key, a payment-received key and a change-registering key; said payment-received key being operably linked to said selector cam and said shifting mechanism for controlling said second connection between said amount-posting keys and said computer assembly; said sub-totalizing key being a multiple-item sub-totalizing key for releasing a machine run to draw a sub-total from all items positively and negatively posted on said amount-posting keys; said payment-received key being operably linked to said selector cam and said shifting mechanism for causing the amount tendered, after being posted on said posting keys, to be entered into said add-subtract computer assembly; said change-registering key being operably linked with said selector cam and said shifting mechanism to draw in said balance totalizer the difference between said sub-total and said amount tendered, whereby said amount of change is computed; key-blocking means selectively controllable between blocking and releasing conditions relative to said change-registering key to prevent and permit actuation thereof respectively; and control means connecting said computer assembly with said blocking means and responsive to said positive balance condition in said computer assembly, whereby said change-registering key is blocked upon posting a positive amount in said amount-posting keys and remains blocked until after the total of amounts negatively registered in said assembly, under control of the payment-received key, reaches the value of the sub-total additively registered.

4. In a business machine for registering single and multiple item transactions, totals of such transactions, the amount tendered by the customer to pay for the purchases, and computing and indicating the amount of change due the customer, said amount of change constituting the difference between the amount of the purchases and the amount tendered; the combination of a balance totalizer; amount-posting keys for posting positive and negative amounts into said totalizer; a plus-minus selector cam rotatable into a plurality of positions including positive selecting, negative selecting, and totalizing selecting positions, feeler lever means engageable with said selector cam for sensing the position thereof, and a totalizer shifting mechanism actuable by said feeler lever means for displacing said totalizer mechanism into respective additive, subtractive and totalizing positions, a plurality of release keys to control the respective positions of said selector cam and including a multiple-item sub-totalizing key for releasing a machine run to draw in said totalizer a sub-total from all items positively and negatively posted on said amount-posting keys; a payment-received key and a change-registering key; each of said release keys being operably connected with said selector cam and shifting mechanism for directly controlling and releasing the respective machine operations for computing said amount of change; said payment-received key being operably linked to said selector cam and said shifting mechanism for causing the amount tendered, after being posted on said posting keys, to be entered into said totalizer; and means under control of said change-registering key and operably linked with said selector cam and said shifting mechanism to displace said totalizer to a condition corresponding to the difference between said sub-total from all items posted and said amount tendered, whereby said amount of change is computed; key-blocking means movable between normal and displaced positions and selectively engageable by said change-registering key and said sub-totalizing key to prevent and permit actuation of each of said latter keys depending upon the position of said blocking means, said sub-totalizing key being blocked and said change-registering key being unblocked by said blocking means when said blocking means is in normal position; and control means connecting said totalizer with said blocking means and responsive to said positive balance condition in said totalizer, whereby upon posting a first item in said totalizer by said amount-posting keys said sub-totalizing key is unblocked and said change-registering key is blocked until after the value negatively registered in said assembly, under control of the payment-received key, reaches the value of the sub-total additively registered.

5. In a business machine according to claim 2, said key-blocking means comprising a displaceable blocking slider which forms abutments for selectively blocking said totalizing key and said change registering key, said totalizer having a highest-digit unit, and said control means connecting said digit unit with said slider for positionally controlling said slider to block and unblock said latter two keys in dependence upon the value-denoting position of said highest-digit unit.

6. In a business machine according to claim 2, said totalizer comprising a plus mechanism and a minus mechanism each having a number of digital units, said plus mechanism being normally set to highest value positions in all of its digital units so as to perform a tens transfer in its highest digital units when any amount is entered into said two mechanisms from said amount-posting keys, and said control means connecting said highest digital unit with said blocking means for controlling said blocking means in response to occurrence of said tens transfer.

7. In a business machine according to claim 2, said totalizer comprising a plus mechanism and a minus mechanism jointly operable and each having a multiplicity of digital units, said plus mechanism being normally set to zero and said minus mechanism being normally set to highest value positions in all of its digital units so as to perform a tens transfer in its highest digital unit when any amount is entered into said mechanisms, said blocking means comprising a displaceable blocking slider having abutments for selectively blocking said totalizing key and said change-registering key, and said control means connecting said highest digital unit of said minus mechanism with said slider for positionally controlling said slider to block and unblock said latter two keys in dependence upon occurrence of said tens transfer.

8. A change-registering business machine having amount-posting keys, an add-subtract computer assembly a payment-received key, a change-registering key, a multiple-item sub-totalizing key, means under control of said sub-totalizing key for drawing in said computer assembly a sub-total from all items positively and negatively posted on said amount-posting keys, transmission means comprising spur gear segments first connecting said computer assembly with said amount-posting keys for displacing said computer assembly in a positive additive sense and secondly connecting said amount-posting keys with said computer assembly for displacing said computer assembly in a negative subtractive sense, this second connection being under control by said payment-received key, in combination with key-blocking apparatus comprising a blocking slider movable between normal and displaced positions and selectively engageable by said change-registering key and said sub-totalizing key to prevent and permit actuation of each of said latter keys depending upon the position of said blocking slider, said sub-totalizing key being blocked and said change-registering key being unblocked by said blocking slider in said normal slider position, control shaft means on which said computer assembly is mounted, said computer assembly having counting gears selectively engageable with said gear segments due to rotary movement of said control shaft means, and said computer assembly comprising a plus mechanism and a minus mechanism conjointly operable and each having a multiplicity of digital units, said plus mechanism being normally set to zero and said minus mechanism being normally set to highest value positions in all of its digital units so as to perform a tens transfer in its highest digital unit when any amount is entered into said mechanisms through said gear segments and counting gears, a single-revolution machine drive selectively controllable by said payment-received key and said change-registering key and said sub-totalizing key respectively, a chain of transmission members connecting said machine drive with said control shaft means of said computer assembly for engaging and subsequently disengaging said counting gears with said gear segments during an individual machine run, and a linking mechanism connecting said highest digital unit of said minus mechanism with said blocking slider and controlled by said machine drive to displace said slider from said normal position during movement of said control shaft from segment-engaged to disengaged position of said counting gears, and a plus-minus selector cam rotatable into a plurality of positions including positive selecting, negative selecting, and totalizing selecting positions, feeler lever means engageable with said selector cam for sensing the position thereof, and a totalizer shifting mechanism actuable by said feeler lever means for displacing said totalizer mechanism into respective additive, subtractive and totalizing positions.

9. In a business machine according to claim 8, said linking mechanism comprising a switching member normally in inactive position and rotatable to active position, said highest digital unit of said minus mechanism having cam means adapted to act upon said switching member for rotating it to active position due to said tens transfer in said digital unit, a linking lever pivotally mounted and having a stop engageable by said switching member when said switching member is in active position, connecting rod means linking said lever with said blocking slider, and mechanism connecting said drive with said switching member for turning it together with said stop and linking lever to thereby move said blocking slider to said displaced position.

10. A change-registering business machine having amount-posting keys, an add-subtract computer assembly displaceable registering positive and negative values posted by said amount-posting keys, a payment-received key, a change-registering key, a multiple-item sub-totalizing key for releasing a machine run to draw a sub-total in said computer assembly from said items posted, said computer assembly comprising a totalizer mechanism and including a plus mechanism and a minus mechanism each having a number of digital units and each unit having a positive counting gear and a negative counting gear differentially interconnected; transmission means comprising gear segments displaceable under control by said amount-posting keys, said gear segments being engageable with said positive counting gears of said mechanisms for positively loading said computer assembly, and said gear segments being engageable with said negative counting gears under control by said payment-received key for negatively loading said computer assembly; a plus-minus selector cam rotatable into a plurality of positions including positive selecting, negative selecting, and totalizing selecting positions, feeler lever means engageable with said selector cam for sensing the position thereof, and a totalizer shifting mechanism actuable by said feeler lever means for displacing said totalizer mechanism into respective additive, subtractive and totalizing positions; key-blocking means movable between normal and displaced positions and selectively engageable by said change-registering key and said sub-totalizing key to prevent and permit actuation of each of said latter keys depending upon the position of said blocking means, said sub-totalizing key being blocked and said change-registering key being unblocked by said blocking means when said blocking means is in normal position, and control means connecting said computer assembly with said blocking means and responsive to positive balance in said computer assembly, whereby upon entering any amount into said computer mechanism said sub-totalizing key is unblocked and said change-registering key is blocked and remains blocked until after the value negatively registered under control of the payment-received key reaches the value of the sub-total additively registered.

11. A change-registering business machine having amount-posting keys, an add-subtract computer assembly displaceable for registering positive and negative values posted by said amount-posting keys, a payment-received key, a change-registering key, a multiple-item sub-totalizing key for releasing a machine run to draw a total from the items posted, said computer assembly comprising a totalizer mechanism and including a plus mechanism and a minus mechanism conjointly operable and each having a multiplicity of digital units, each unit having a positive counting gear and a negative counting gear differentially interconnected; transmission means comprising gear segments displaceable under control by said amount-posting keys in the additive sense, said positive counting gears being alignable with said segments under control by said selector keys and said negative counting gears being alignable with said segments under control by said payment-received key in the subtractive sense, a rotatably displaceable control shaft means on which said computer mechanisms are mounted, start-stop drive means connected with said control shaft means for controlling said shaft means to place the aligned counting gears into meshing engagement with said respective segments and to thereafter disengage said counting gears whereby the amounts posted by means of said amount-posting keys are transferred into said computer assembly, a plus-minus selector cam rotatable into a plurality of positions including positive selecting, negative selecting, and totalizing selecting positions, feeler lever means engageable with said selector cam for sensing the position thereof, and a totalizer shifting mechanism actuable by said feeler lever means for displacing said totalizer mechanism into respective additive, subtractive and totalizing positions; a blocking slider movable between normal and displaced positions and selectively engageable by said change-registering key and said sub-totalizing key to prevent and permit actuation of each of said latter keys depending upon the position of said blocking means, said sub-totalizing key being blocked and said change-registering key being unblocked by said blocking slider in said normal slider position, control means connecting said computer assembly with said blocking means and responsive to positive balance in said computer assembly, whereby said change-registering key is blocked upon posting an amount and remains blocked until after the value negatively registered under control of the payment-received key reaches the value of the sub-total additively registered; balance-drawing means connectable with said negative counting gears of said minus mechanism and controlled by said change-registering key for drawing a balance from said computer assembly, and means for resetting said gear segments while said segments are in engagement with said positive counting gears of said plus mechanisms whereby said plus mechanism is reset to zero.

12. In a business machine according to claim 11, said control shaft means comprising two individually rotatable control shafts on which said plus mechanism and said minus mechanism are mounted respectively, said two shafts being displaceable in the axial direction together with said respective mechanisms for selectively aligning said positive and negative counting gears with said gear segments, a lever transmission connecting said drive means with said shafts for axially displacing said shafts and mechanisms between the two counting-gear alignment positions; said drive means having a plurality of programming cam means comprising a first cam for adding operation and a second cam for balance-drawing operation, two reciprocable slide bars and linking means connecting them with said first and second cams respectively whereby said two bars are reciprocated for adding operation and balance drawing operation respectively; coupling members selectively operable under control by said control keys and connecting when selected said slide bars with said respective control shafts for rotating said shafts to engage and disengage said counting gears with said segments in accordance with the reciprocation of said respective slide bars; and linking means connecting said change-registering key with said coupling levers and controlled by said cam means to sequentially select said coupling levers, whereby, when a balance is drawn by actuation of said change-registering key, said computer mechanisms are first engaged by means of said coupling members with said segments under control by said adding-operation slide bar and thereafter are engaged with said segments and reset to normal condition under control by the balance-drawing slide bar.

13. A change-registering business machine according to claim 2, said computer assembly having digital units, said key-blocking means comprising a key-blocking slider movable between normal and displaced positions and selectively engageable by said change-registering key and said totalizing key to prevent and permit actuation of each of said latter keys depending upon the position of said blocking means, said sub-totalizing key being blocked and said change-registering key being unblocked by said blocking slider when said slider is in normal position, and control means for moving said blocking slider between said two positions in order to unblock said sub-total key upon posting an amount and simultaneously blocking said change-registering key until after the value negatively registered under control of the payment-received key reaches the value of the sub-total additively registered, said control means comprising two actuating devices, one of said devices having a part connected with the highest digital unit of said computer assembly for displacing said slider from normal position in response to tens transfer in said unit, and said other device having a latch lever controlled by all digital units of said computing mechanism for causing said slider to permit actuation of said change-registering key when all of said digital units are zeroed.

14. A change-registering business machine having amount-posting keys, a payment-received key for causing entry of negative amounts, machine-run control keys comprising a sub-total key and a change-registering key, a computer mechanism comprising a multiplicity of digital units each having a positive counting gear and a negative counting gear differentially interconnected; transmission means comprising gear segments displaceable under control of said amount-posting keys in the additive sense, said positive counting gears being alignable with said segments and said negative counting gears being alignable with said segments under control of said payment-received key in the subtractive sense, a rotatably displaceable control shaft on which said computer mechanism is mounted, drive means connected with said control shaft for rotating it to place the aligned counting gears into meshing engagement with said segments and to thereafter disengage said gears from said segments whereby the amounts posted by means of said amount-posting keys are entered into said computer mechanism, a plus-minus selector cam rotatable into a plurality of positions including positive selecting, negative selecting, and totalizing selecting positions, feeler lever means engageable with said selector cam for sensing the position thereof, and a computer mechanism displacing device actuable by said feeler lever means for displacing said computer mechanism into respective additive, subtractive and totalizing positions; a blocking slider movable between normal and displaced positions and selectively engageable by said change-registering key and said sub-totalizing key to prevent and permit actuation of each of said latter keys depending upon the position of said blocking means, said sub-totalizing key being blocked and said change-registering key being unblocked by said blocking slider in said normal slider position, control means connecting said computer mechanism with said slider for moving said slider to displaced position in response to entry of any amount into said mechanism and returning said slider to normal position when the value negatively registered under control by said payment-received key reaches the sub-total amount additively registered, said control means comprising a latch movable between latching and releasing position, and connected with said blocking slider only when in latching position to then prevent blocking of said change-registering key, said drive means being connected with said latch for imparting thereto movement toward said latching position during segment-disengaging motion of said computer mechanism, and feeler means engageable with said computer mechanism and connected with said latch to permit movement of said latch to latching position only when all positive counting gears of said mechanism are zeroed.

15. A business machine according to claim 14, comprising a computer frame structure mounted on said control shaft, said computer mechanism having said digital units coaxially mounted on said frame structure and each of said units having a tens-transfer disc provided with a notch; said feeler means comprising a feeler frame pivotally mounted on said computer frame structure and provided with feeler members, spring means biasing said feeler frame relative to said frame structure toward engagement of said feeler members with said respective discs whereby said feeler members enter into said notches and permit pivotal motion of said feeler frame only when all said digital units are zeroed, said latch being pivotally mounted on said computer frame structure, and a pin-and-slot connection linking said latch with said feeler frame for moving said latch to said latching position when all said units are zeroed.

16. A change-registering business machine having amount-posting keys, a payment-received key for causing entry of negative amounts, machine-run control keys comprising a total key and a change-registering key, a computer assembly, transmission means first connecting said computer assembly with said amount-posting keys in the additive sense and secondly connecting said amount-posting keys with said computer assembly in the subtractive sense, this second connection being under control by said payment-received key, in combination with key-blocking means selectively controllable between blocking and releasing conditions relative to said change-registering key to prevent and permit actuation thereof respectively, control means connecting said computer assembly with said blocking means and being responsive to positive balance in said computer assembly to keep said change-registering key blocked from the entering of an amount until after the value negatively registered under control of the payment received key reaches the value of the sub-total additively registered, drive means operatively connected with said computer assembly and said blocking means for causing them to complete a multiple-item transaction, and drive control means including a selector cam connected with said drive means and selectively controllable by said total key and said change-received key, whereby a multiple-item transaction can be selectively terminated by either one of said latter two keys.

17. In a business machine according to claim 16, said computer assembly comprising a plus mechanism and a minus mechanism each having a number of digital units and each unit having a positive counting gear and a negative counting gear differentially interconnected to register mutually complementary values, said plus mechanism being normally set to zero and said minus mechanism being normally set to maximum in all digital units whereby tens transfer occurs in said minus mechanism upon entering any amount into said computer assembly, said control means being connected with said minus mechanism for response to said tens transfer; said transmission means having gear segments selectively engageable with said positive and negative counting gears under control by said selector keys and said payment-received key respectively; and said drive control means comprising a pivotally mounted coupling lever and linking means controlled by actuation of said total key and connected with said minus mechanism to engage said negative counting gears of said minus mechanism with said segments for resetting said minus mechanism to its normal setting when a total is being drawn from said positive counting gears of said plus mechanism.

18. In a business machine according to claim 17, said control keys comprising a sub-total key, and switching means linking said sub-total key with said coupling lever for turning said coupling lever to inactive position when said sub-total key is actuated, whereby resetting of said minus mechanism is prevented.

References Cited in the file of this patent

UNITED STATES PATENTS

| | | |
|---|---|---|
| 1,934,747 | Sundstrand | Nov. 13, 1914 |
| 2,079,355 | Lee | May 4, 1937 |
| 2,118,588 | Butler | May 24, 1938 |
| 2,229,834 | Anderson | Jan. 28, 1941 |
| 2,274,803 | Muller | Mar. 3, 1942 |
| 2,428,084 | Lambert | Sept. 30, 1947 |
| 2,853,232 | Goodbar et al. | Sept. 23, 1958 |
| 2,950,047 | Barberis | Aug. 23, 1960 |
| 2,974,860 | Werner et al. | Mar. 14, 1961 |